United States Patent [19]
Feng et al.

[11] Patent Number: 6,043,900
[45] Date of Patent: Mar. 28, 2000

[54] METHOD AND SYSTEM FOR AUTOMATICALLY DETECTING A BACKGROUND TYPE OF A SCANNED DOCUMENT UTILIZING A LEADEDGE HISTOGRAM THEREOF

[75] Inventors: Xiao-fan Feng, Vancouver, Wash.; Roger L. Triplett, Penfield, N.Y.

[73] Assignee: Xerox Corporation, Stamford, Conn.

[21] Appl. No.: 09/052,638

[22] Filed: Mar. 31, 1998

[51] Int. Cl.[7] .............................. G06K 15/02; G06T 5/40
[52] U.S. Cl. ........................... 358/1.9; 382/169; 382/274
[58] Field of Search .................................. 382/169, 168, 382/274, 273; 358/261

[56] References Cited

U.S. PATENT DOCUMENTS

| | | | |
|---|---|---|---|
| 4,695,884 | 9/1987 | Anastassiou et al. | 382/169 |
| 5,133,022 | 7/1992 | Weideman | 382/274 |
| 5,680,477 | 10/1997 | Asada | 382/169 |

*Primary Examiner*—Scott Rogers
*Attorney, Agent, or Firm*—Michael J. Nickerson

[57] ABSTRACT

A method and system automatically determines proper background values for a document. A histogram of the document is generated and it is determined whether a background characteristic of the document is uniform. If the background is uniform, a white background value is set equal to a first calculated white peak value. If the background is non-uniform, the white background value is set equal to a second calculated white peak value. A foreground value of the document is analyzed for validity when it is determined that a background characteristic of the document is uniform. A black background value is set equal to a black peak value calculated from the histogram when it is determined that a foreground value of the document is valid.

18 Claims, 27 Drawing Sheets

METHOD AND SYSTEM FOR AUTOMATICALLY DETECTING A BACKGROUND TYPE OF A SCANNED DOCUMENT UTILIZING A LEADEDGE HISTOGRAM THEREOF

FIELD OF THE PRESENT INVENTION

The present invention is directed to a system and method for automatically detecting the background type of a document being scanned by a scanning system More particularly, the present invention is directed to a method and system for detecting the background type of a document being scanned and determining an optimal method to render the image based on a leadedge histogram developed from scanning the document.

BACKGROUND OF THE PRESENT INVENTION

Traditionally, copier, in the office equipment context, refers to light lens xerographic copiers in which paper originals are in fact photographed. The images are focused on an area of a photoreceptor, which is subsequently developed with toner. The developed image on the photoreceptor is then transferred to a copy sheet which in turn is used to create a permanent copy of the original.

In recent years, there has been made available what is known as digital copiers. With respect to the most basic functions, a digital copier performs the same functions as a light lens copier, except that the original image to be copied is not directly focused on a photoreceptor. Instead, with a digital copier, the original image is scanned by a device generally known as a raster input scanner (RIS) which is typically in the form of a linear array of small photosensors.

The original image is focused on the photosensors in the RIS. The RIS converts the various light and dark areas of the original image to a set of digital signals. These digital signals are temporarily retained in a memory and then eventually used to operate a digital printing apparatus when it is desired to print copies of the original or a display screen when it is desired to display the image; i.e., the image is scanned and converted to electrical signals so that the image can be used for other reproduction or storage purposes. The digital signals may also be sent directly to the printing device or display device without being stored in a memory. The digital printing apparatus can be any known type of printing system responsive to digital data, such as a modulating scanning laser which discharges image portions of a photoreceptor, or an ink jet printhead.

With the migration of the copying and scanning systems to a digital base system, the systems faced different problems than from the light lens or analog copying systems. More specifically, in a digital reprographic system, the scanning system needs to locate the actual location of the document so that any desired image processing routines can be applied to the correct pixels of image data. Moreover, a digital reprographic system should determine the background type of the original to ensure optimal rendering.

In describing the present invention, the terms pixel will be utilized. This term may refer to an electrical (or optical, if fiber optics are used) signal which represent the physically measurable optical properties at a physically definable area on a receiving medium. The receiving medium can be any tangible document, photoreceptor, or marking material transfer medium Moreover, the term pixel may refer to an electrical (or optical, if fiber optics are used) signal which represent the physically measurable optical properties at a physically definable area on a display medium. A plurality of the physically definable areas for both situations represent the physically measurable optical properties of the entire physical image to be rendered by either a material marking device, electrical or magnetic marking device, or optical display device.

Lastly, the term pixel may refer to an electrical (or optical, if fiber optics are used) signal which represents physical optical property data generated from a single photosensor cell when scanning a physical image so as to convert the physical optical properties of the physical image to an electronic or electrical representation. In other words, in this situation, a pixel is an electrical (or optical) representation of the physical optical properties of a physical image measured at a physically definable area on an optical sensor.

In a digital scanning system, it is desirable to perform image processing routines which will optimize the reproduction of the image of the document. These routines could include improving the contrast between the desired image and the document's background. In other words, it is sometimes desirable to remove the background of a document and replace this image data with a reference white value so that the desired image becomes sharper and more discernible in the reproduced document. This replacement of the background with a reference value is only effective if the background is uniform. If the background is not uniform, the desirable image data may be lost with such a global replacement.

Thus, it is important in a digital scanning system to determine the background value of the document being scanned; i.e., whether the document has a white or dark background; and to determine if the background of the scanned document is uniform or not. This determination of the background value and its uniformity for a document is particularly important in an engineering document scanning system.

In an engineering document scanning system, the input document can have a wide range of backgrounds with some documents having uniform backgrounds and others having non-uniform backgrounds. For example, engineering scanners are used to scan large format engineering documents such as CAD drawings, diablo, vellum, and sepia, etc., and to convert these scanned documents to binary bitmap image for printing. One of the most challenging tasks for an engineering scanner is to have the ability to scan these diverse originals with only one trial and produce a good quality binary image for printing. The original ranges from normal white background to dark sepia with the background level below 10 digital count for an 8-bit scanner. The diversity in originals makes it very difficult to manually determine a correct darkness setting to reproduce the original with a binary printer. Conventionally, the operator uses trial-and-error methods to find the correct threshold.

Such a trail and error process consumes the time and energy of the user and adversely impacts productivity. Moreover, this conventional manual method produces wasted copies since a user cannot always input the correct contrast value the first time. Thus, it would be desirable to have an automatic background detection system to determine the document's background value and whether the background is uniform when the document is being scanned.

The present invention demonstrates an automatic and simple low cost system and method to optimally render an engineering document. More specifically, the present invention proposes a method and system for providing automatic detection of the background value and background type of a document wherein the present invention utilizes a ratio of the white peak to the half power width of the histogram white peak to determine the background type of the document. By utilizing this ratio, the uniformity of the document's background can be verified while significantly reducing false determinations of uniformity. Once the background value is determined and its uniformity is verified, the present invention can adjust the A/D voltage reference and the tone reproduction curve (TRC) to effectively compensate for the background difference between different originals and to make it possible to render difficult images with only one trial. This method can improve the productivity and reduce the cost associated with wasted bad copies and operator's time.

SUMMARY OF THE PRESENT INVENTION

One aspect of the present invention is a method for automatically determining proper background values for a document. The method generates a histogram of the document; determines if a background characteristic of the document is uniform; sets a white background value equal to a first calculated white peak value when it is determined that a background characteristic of the document is uniform; and sets a white background value equal to a second calculated white peak value when it is determined that a background characteristic of the document is non-uniform. The method determines if a foreground value of the document is valid when it is determined that a background characteristic of the document is uniform and sets a black background value equal to a black peak value calculated from the histogram when it is determined that a foreground value of the document is valid.

Another aspect of the present invention is a system for automatically determining proper background values for a document. The system includes a histogram circuit to generate a histogram of the document and a background value generation and detection circuit to determine if a background characteristic of the document is uniform. The background value generation and detection circuit sets a white background value equal to a first calculated white peak value when it is determined that a background characteristic of the document is uniform and sets a white background value equal to a second calculated white peak value when it is determined that a background characteristic of the document is non-uniform. The background value generation and detection circuit determines if a foreground value of the document is valid when it is determined that a background characteristic of the document is uniform and sets a black background value equal to a black peak value calculated from the histogram when it is determined that a foreground value of the document is valid.

Further objects and advantages of the present invention will become apparent from the following descriptions of the various embodiments and characteristic features of the present invention.

BRIEF DESCRIPTION OF THE DRAWINGS

The following is a brief description of each drawing used to describe the present invention, and thus, are being presented for illustration purposes only and should not be imitative of the scope of the present invention, wherein.

DETAILED DESCRIPTION OF THE PRESENT INVENTION

The following is a detailed description of the present invention. In this description and in the Figures, like reference numbers represent equivalent circuits and/or equivalent functions.

Figure 1:
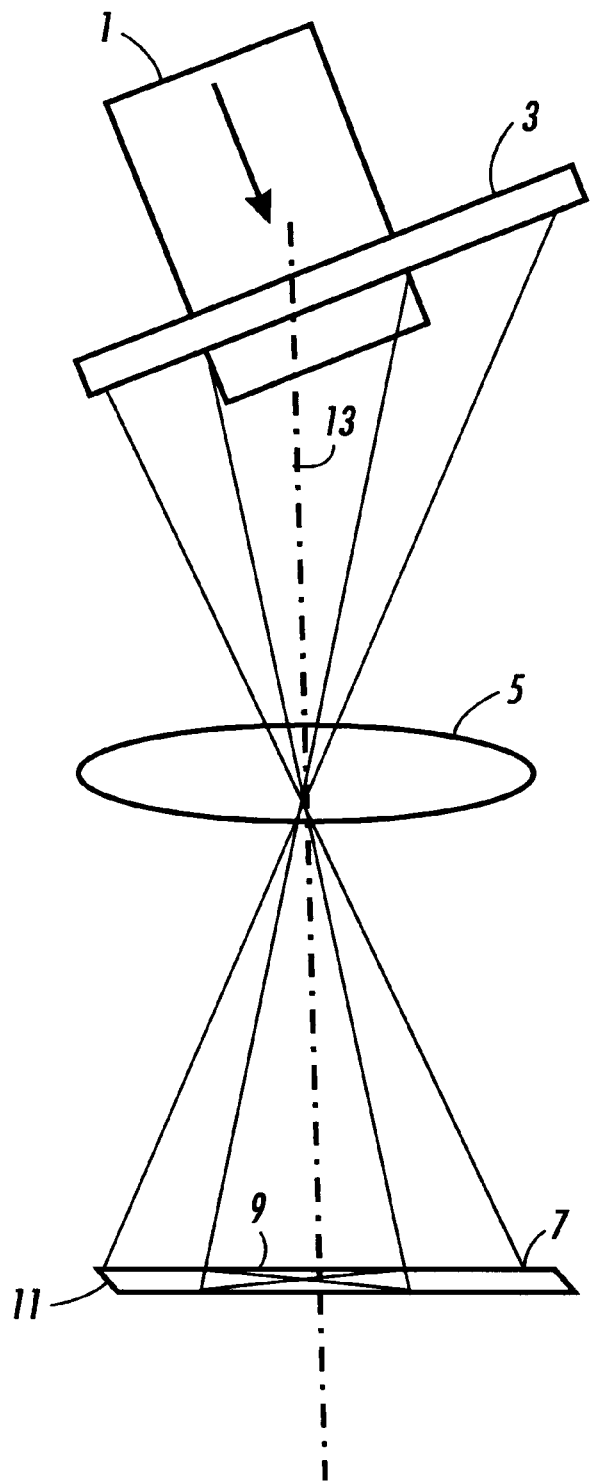
FIG. 1 is a schematic of a typical digital scanning system.

As noted above, FIG. 1 is a schematic of a typical digital scanning system. As illustrated in FIG. 1, a document 1 is scanned by a CCD sensor 7. In the particular system illustrated in FIG. 1, the document 1 is moved past the CCD sensor 7 through the use of a backing roll 3. It is noted that the movement between the document 1 and the CCD sensor 7 is relative in that the CCD sensor 7 can be moved and the document 1 remain stationary. The light reflected from the document 1 and the backing roll 3 passes through a lens system 5 which focuses the reflected light upon the CCD sensor 7. The reflected light is focused with respect to an optical center line 13. The reflected image 9 of the document 1 is converted by the CCD sensor 7 into pixels of image data as well as the reflected image of the backing roll 11. Thus, the CCD sensor 7 produces pixels of image data which represent both the reflected image of the backing roll 11 and the reflected image 9 of the document 1.

As noted above, it is desirable to determine a document's background value and its uniformity. To accomplish this, the present invention initially produces a leadedge histogram of the document in a conventional manner. An example of such a histogram is illustrated in FIG. 2.

Figure 2:
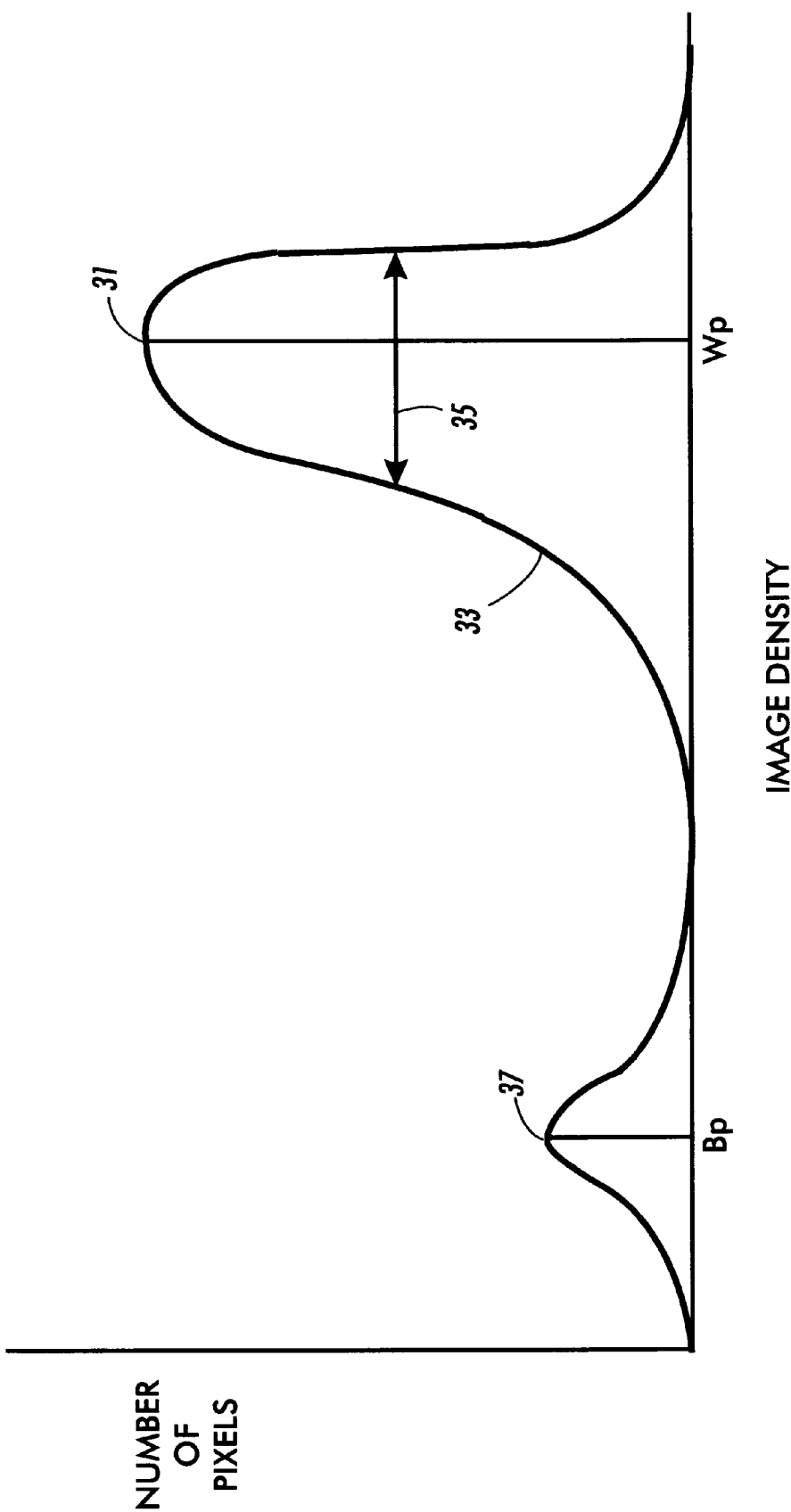
FIG. 2 is a graphical representation of a typical histogram of a document.

FIG. 2 illustrates a typical histogram wherein the histogram 33 includes two separate peaks 31 and 37. Peak 31 represents the white peak value or document background value, while peak 37 represents the black peak value or the value of the desired image. These peak values, along with a width value 35 of the distribution of the white peak value, are utilized to determine a threshold values which will be utilized in determining whether a pixel is black or white, and whether the document's background value is uniform over the document. In other words, the present invention estimates the document background value and its type with respect to uniformity and then finds an optimal method to render the image.

For example, if the original has uniform background, the background is automatically removed so that the result image is free from background. If the image is a non-uniform dark original, the image is rendered as gray so as to preserve any weak text/line information which may be found in the document (original).

To realize these results, according to a preferred embodiment of the present invention, the original document is loaded into a digital scanner. A leadedge is collected by scanning an inch of the document in grayscale. The leadedge data is then used to determine the background level as well as the type. Upon obtaining this leadedge data, the preferred embodiment of the present invention begins to process this data to determine the background value and the background's uniformity.

Figure 3:
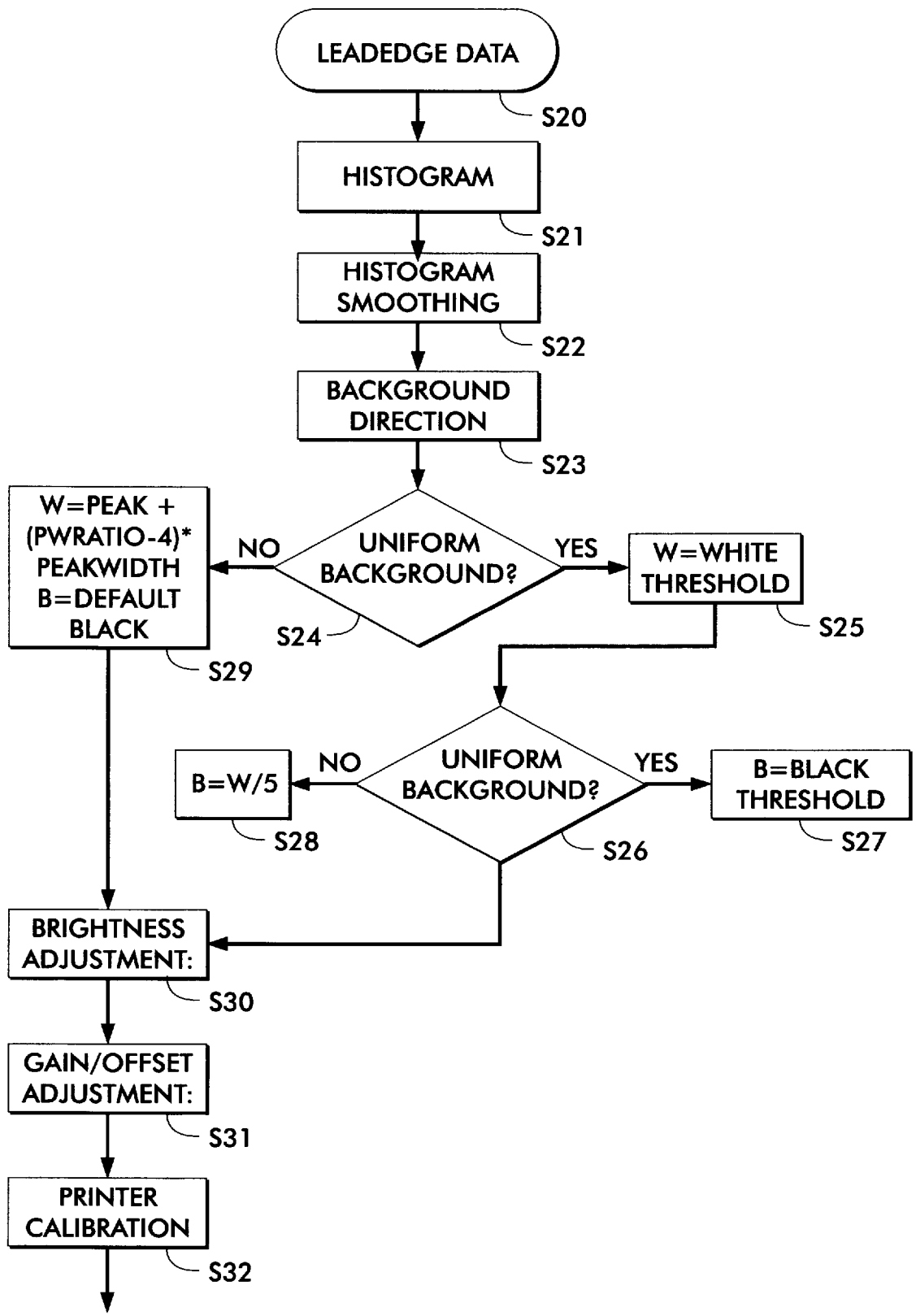
FIG. 3 is a flowchart showing a method for automatically detecting a background value and a background's uniformity of a document according to the concepts of the present invention.
Figure 4:
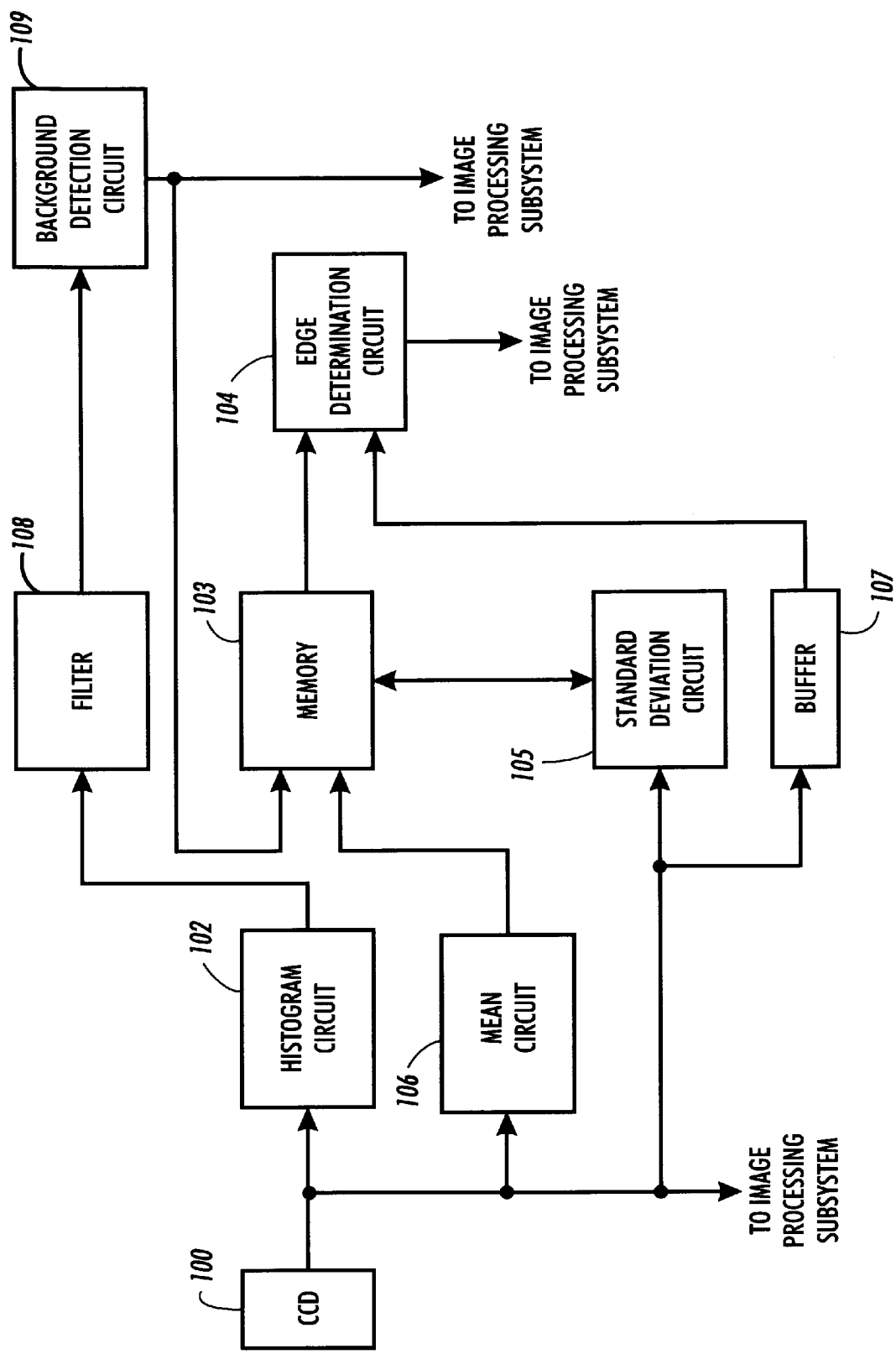
FIG. 4 is a block diagram showing a system for automatically detecting a background value and a background's uniformity of a document according to the concepts of the present invention.

FIG. 3 shows the flowchart of the process carried out by the preferred embodiment of the present invention. As illustrated in FIG. 3, leadedge data, utilizing conventional methods, is generated at Step S20. From this leadedge data, a histogram is generated at Step S21, which represents the distribution of the signal level as the sensor of the scanner sees the document. At Step S22, the histogram data is smoothed. In the preferred embodiment, the histogram is smoothed using a 5-element moving an average filter to eliminate false peak cause by noise and non-uniform originals.

The smoothed histogram data is utilized in determining a background value at Step S23. A more detail discussion of this background value detection process will be discussed later. At Step 23, the background information in conjunction with the histogram data is analyzed to determine if the background is uniform.

To determine if the background is uniform, the preferred embodiment uses the ratio of the calculated white peak value and the width of the peak at the half power of the white peak. More specifically, the smoothed histogram is used to determine the white peak ($P_0$) and quarter peak ($P_{1/4}$). The width of the peak at the half power is also calculated. These various values are illustrated in FIG. 5.

Figure 5:
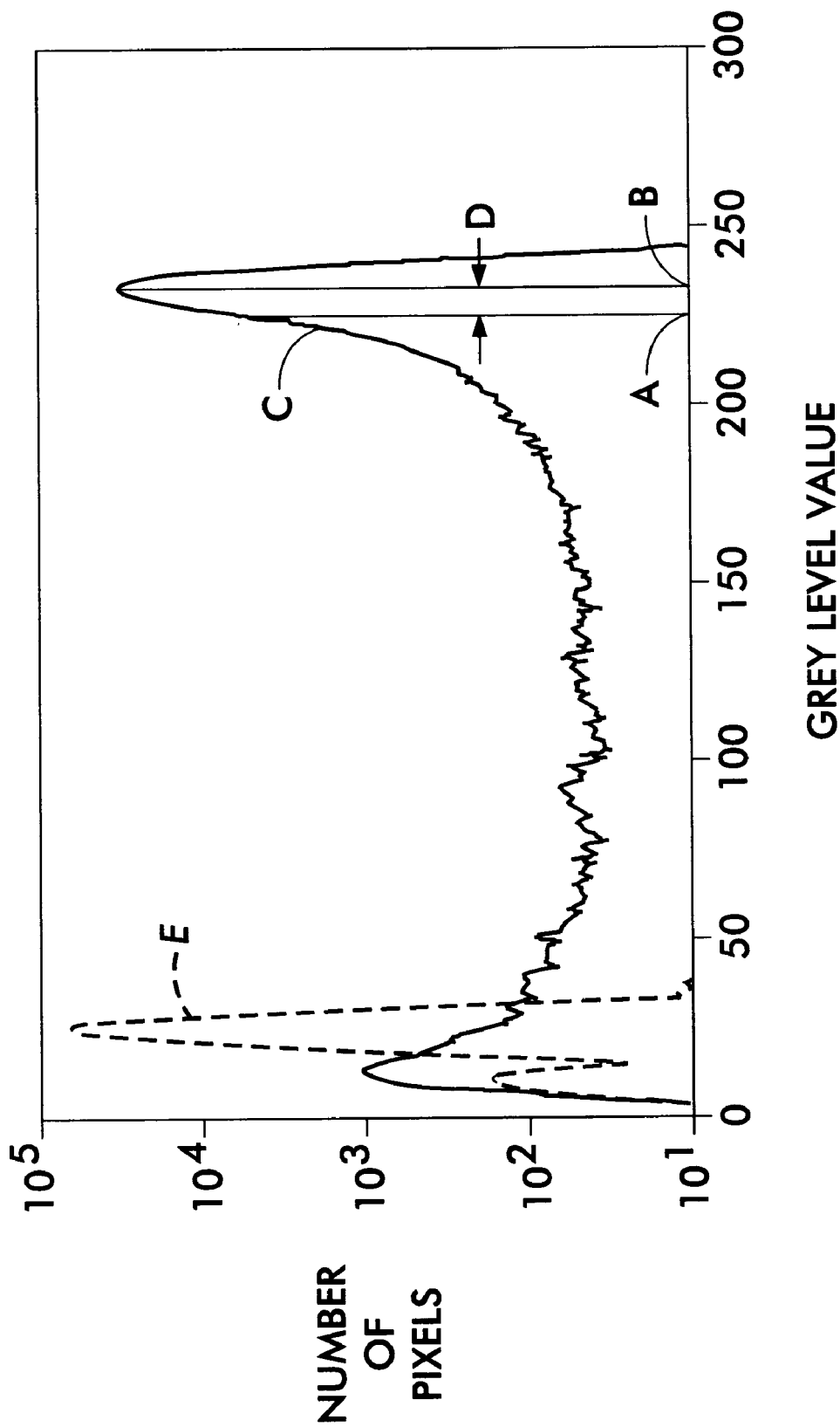
FIG. 5 is a graphical representation of an example histogram of a document used to calculate the document's background value and its background uniformity.

As illustrated in FIG. 5, "A" represents the quarter peak value of the white peak of the histogram "C" while "B" represents the white peak value. Moreover, "D" represents the half power width of the histogram white peak "B", and "E" represents the black peak of the histogram "C".

In this determination of the background's type; i.e., whether the background is uniform; the peak-to-width ratio is given by PWratio=$2P_0/B$, where B is the half power width ("D" of FIG. 5). As noted above, the PWratio is used to determine the background type. In the preferred embodiment, if the PWratio is larger than 8, the document is considered uniform. Thus, it is possible to render the document with a clean background. In other words, if the background is uniform, the white threshold value is set equal to the calculated white background value at Step S25. In the preferred embodiment, the white background level is calculated using the following when the greyscale range for a pixel is 0 to 255:

$$W_{bkg}=P_0-a(P_0-P_{1/4})$$

where: a=2.375 if $P_0$>150 (white documents)

a=$2.375*(P_0/150)^2$ if $P_0 \leq 150$ (dark document documents) Thereafter, at step S26, it is determined if the foreground is valid. This validity determination, in the preferred embodiment, looks at the calculated black background value. More specifically, the preferred embodiment determines the calculated black peak (the digital count of foreground information such as lines and text). If the calculated black peak is less $W_{bkg}/2.5$, it is a valid back threshold; i.e., the document has a valid foreground; and Step S27 sets the black threshold value equal to the calculated black background value. On the other hand, if the calculated black peak is greater than $W_{bkg}/2.5$, it is not a valid back threshold; i.e., the document does not have a valid foreground; and Step S28 sets the black threshold value equal to an empirical black of $W_{bkg}/5$.

If Step S24 determines that the background is not uniform; i.e., in the preferred embodiment, the PWratio is less than 8; it is impossible to render clean background without loss of foreground image information. For this case, it is more imperative to preserve the information than a clean background. Thus, the preferred embodiment of the present invention renders the background gray to preserve weak gray lines and text. At Step S29, the background level is given by $W_{bkg}=P_0+(PWratio-4) * B$, wherein the background level ($W_{bkg}$) increases with the PWratio. For non-uniform originals according to the preferred embodiment of the present invention, the black threshold is always set to 8 graylevels.

Once the white and black thresholds are determined, a TRC look-up table (LUT) is generated to map the white threshold to 255 and black threshold to 0 so that the brightness and gain/offset can be conventionally adjusted at Steps S30 and S31, respectively, and the printer can be conventionally calibrated at Step S32.

FIG. 5 illustrates a block diagram of a circuit which is utilized to determine the background values of the document to be scanned and whether the background is uniform. As illustrated in FIG. 5, a CCD sensor array 100 produces image data which is fed into a histogram circuit 102, a mean calculation circuit 106, a standard deviation calculation circuit 105, and a buffer 107. The histogram circuit 102 determines the histogram of the image data and feeds the histogram data to a filter 108 which smoothes the histogram data before it processed by the background detection circuit 109. The background detection circuit 109 calculates the background values and the background type as discussed above. These background values are then fed to memory 103 to be stored temporarily for further processing. The background values and type are also sent to the image processing module or subsystem to be utilized when rendering the image.

The mean calculating circuit 106 calculates the mean value for each column of pixels and sends the mean values to the memory 103. The standard deviation calculating circuit 105 receives the image data as well as mean data from memory 103 to determine the standard deviation of the data for each column and sends the standard deviation values to the memory 103. An edge determination circuit 104 is connected to memory 103 and buffer 107 so as to receive the proper data needed to calculate the physical edge of the document to be scanned.

As noted above, the present invention relies on the determination of the white peak value and the black value. The preferred embodiment for determining these values will be discussed in more detail below.

To calculate this background value, a histogram of the video pixels representing the scanned image is obtained. In the preferred embodiment of the present invention, the video pixels used to generate the histogram are from within a programmed window location near the leading edge of the image (document). Moreover, in the preferred embodiment of the present invention, the histogram and the background value of the image are generated during a single scan of the image.

Upon obtaining the histogram data, the values, white peak and white threshold, are determined. More specifically, the white peak value is the grey level with greatest number of pixels having an intensity related to the background (white) value of the image being scanned. Moreover, the white threshold value is the actual background value to be used in the image processing system calculated from the histogram data.

Figure 6:
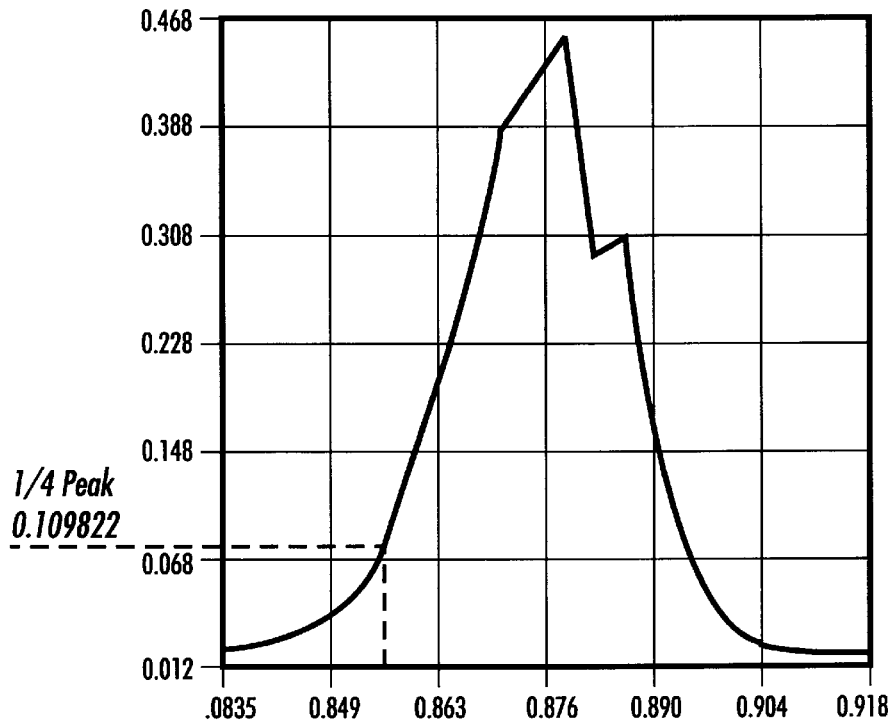
FIG. 6 is a graphical representation of a histogram distribution for a scanned sheet of white paper.

An example of a histogram distribution is illustrated in FIG. 6. FIG. 6 shows a normalized histogram distribution for a scanned sheet of white paper. It is noted that the histogram distribution values illustrated in FIG. 6 have been normalized so that the maximum bin value is 0.45577 and the histogram scale has been normalized from a 0 to 255 range to a 0 to 1 range. The distribution is centered about the mean pixel value which is 0.875238. The standard deviation of this distribution of data has been calculated to be 0.875301.

Figure 7:
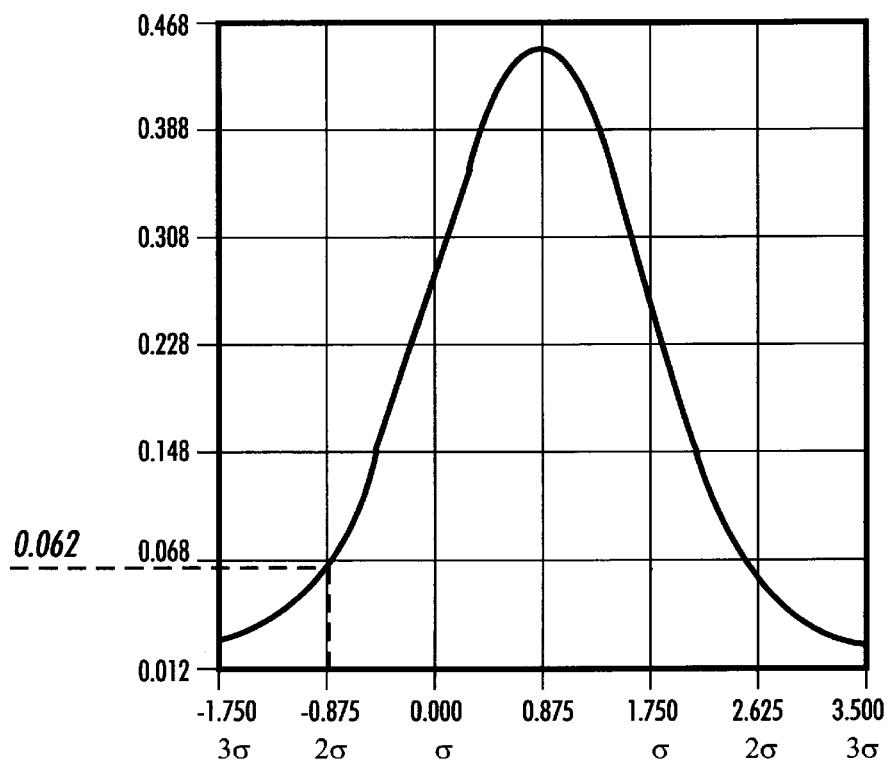
FIG. 7 is a graphical representation illustrating a normal Gaussian distribution curve having the same mean and standard deviation as the distribution illustrated in FIG. 6.

In comparison, FIG. 7 shows a normal Gaussian distribution curve having the same mean (0.875238) and same standard deviation value (0.875301) as in FIG. 1. As demonstrated by the illustrated distributions illustrated, the histogram distribution of the background video of a white piece of paper may be approximated by a normal Gaussian distribution curve.

Histogram data can be generated in many ways. For example, an entire image can be scanned and each pixel of the image is placed in a corresponding grey level bin to generate the histogram. On the other hand, according to a preferred embodiment of the present invention, only a window or subsample of the entire image needs to be gather to create a histogram so as to determine the background value and black threshold value of the image.

In such a situation, the histogram sample window is defined by four coordinates, the number of scanlines to be sampled (bottom), the number of leading scanlines to skip (in slowscan direction) before sampling begins (top), the number of leading pixels to skip (in fastscan direction) before sampling begins (left), and the number of pixels within a scanline to be sampled (right). There are no limits on the number of pixels or scanlines which may be skipped or sampled as long as the sample window falls within the image being scanned. An example of such a histogram sample window is illustrated in FIG. 20.

Figure 20:
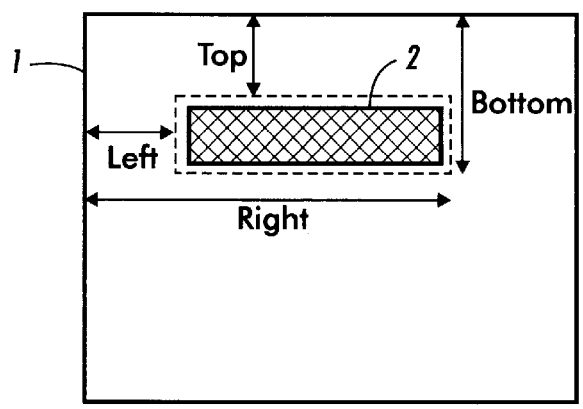
FIG. 20 is a graphical representation of a sample window used to generate the histogram data according to the present invention.

As illustrated in FIG. 20, the image 1 is scanned wherein a sample window 2 of the scanned image data is utilized to create the histogram distribution or data. This sample window 2 is defined by a left coordinate, top coordinate, bottom coordinate, and right coordinate as defined above. From the histogram information gathered in the sample window, the present invention can utilize the shape of a histogram distribution to determine both the background value of the document and the black threshold value of the document.

Figure 22:
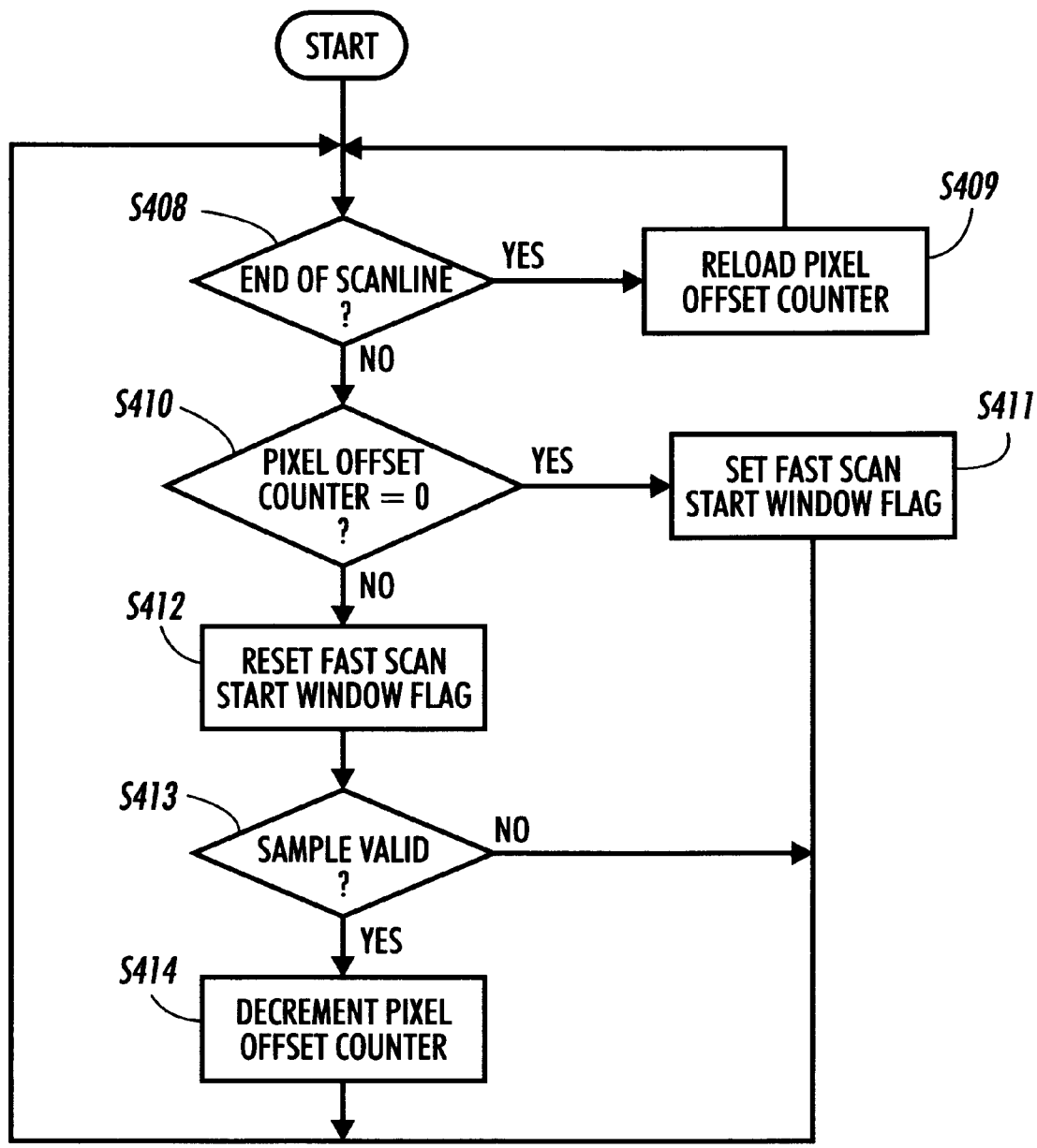
FIG. 22 is a flowchart illustrating the determination of the leading edge of the sample window in a fastscan direction.

FIG. 22 illustrates a flowchart showing a process for determining the leading edge of the sample window in a fastscan direction. Fastscan direction refers to the scanning of the image through the electronic scanning of the CCD or full width array sensor. As illustrated in FIG. 22, step S408 determines whether the end of a scanline has been reached. If the end of the scanline has been reached, step S409 reloads the pixel offset counter to the value representing the number of pixels to be skipped in the fastscan direction.

On the other hand, if step S408 determines that the end of the scanline has not been reached, step S410 determines whether the pixel offset counter is equal to 0. If the pixel offset counter is equal to 0, step S411 sets the fastscan start window flag to 1. Moreover, if the pixel offset counter is not equal to 0, step S412 resets the fastscan start window flag to 0. The process then determines whether the sample pixel is valid image data at step S413. If the sample is valid, a pixel offset counter is decremented at step S414.

Figure 21:
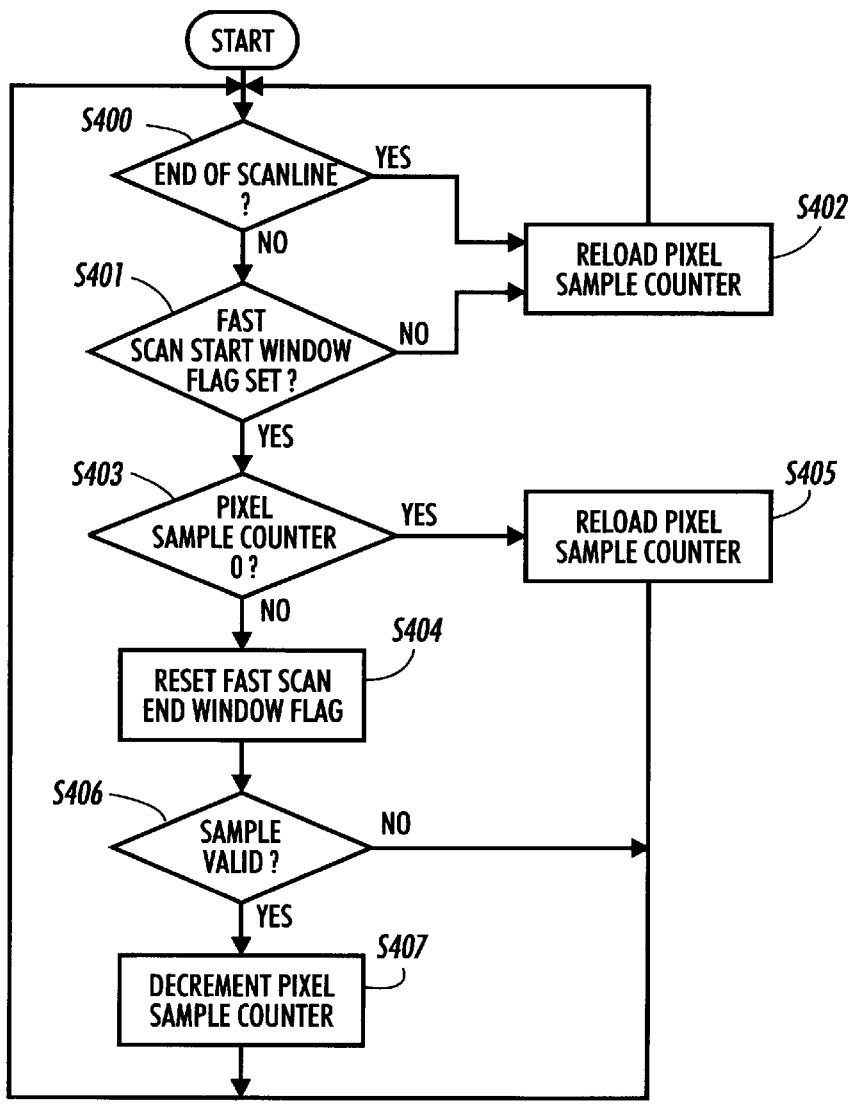
FIG. 21 is a flowchart illustrating the determination of which pixels within a scanline are to be sampled for a histogram.

FIG. 21 illustrates a flowchart showing a process for determining which pixels within a sample window to be used in generating the histogram distribution or data. As illustrated in FIG. 21, step S400 determines whether an end of scanline has been reached. If the end of scanline has been reached, step S402 reloads the pixel sample counter with the number of pixels to be sampled within a scanline. If the end of the scanline has not been reached, step S401 determines whether the fastscan start window flag has been set.

If this flag has not been set, step S402 again reloads the pixel sample counter with the number of pixels to be sampled within a scanline. On the other hand, if the fastscan start window flag is set, step S403 determines whether the pixel sample counter equals 0. If the pixel sample counter does not equal 0, step S404 resets the fastscan end window flag to 0. Moreover, if the pixel sample counter is equal to 0, step S405 sets the fastscan end window flag to 1. The process further determines at step S406 whether the sample pixel is valid. If the sample is valid, step S407 decrements the pixel sample counter.

Figure 23:
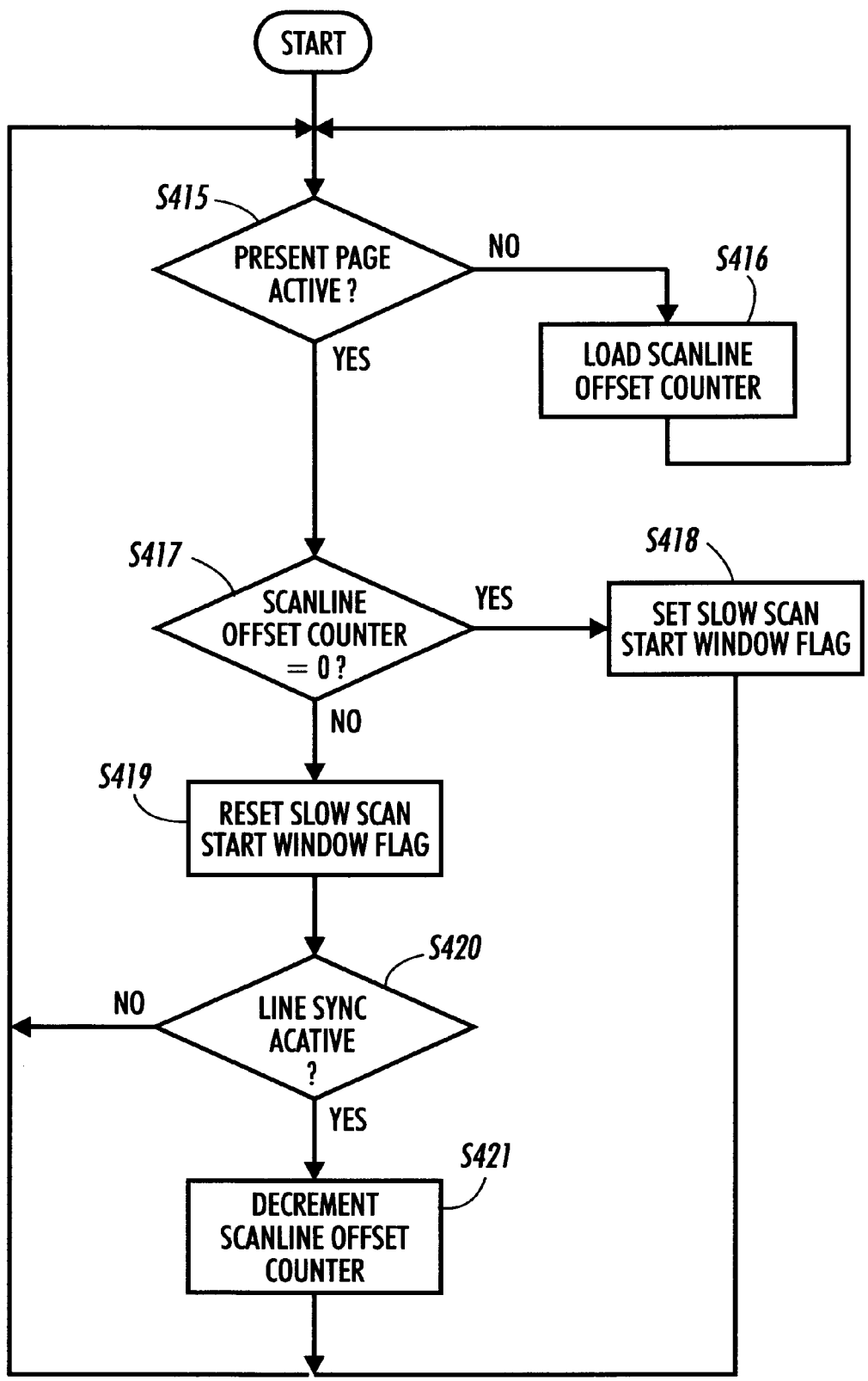
FIG. 23 is a flowchart illustrating the determination of the leading edge of the sample window in a slowscan direction.

FIG. 23 illustrates a flowchart showing the determination of the leading edge of the sample window in the slowscan direction. Slowscan direction refers to the scanning of the image through the relative physical movement between the CCD or full width array sensor and the document. As illustrated in FIG. 23, step S415 determines whether the present page of the image is active. If the present page of the image is not active, step S416 loads the scanline offset counter with the value equal to the number of scanlines skipped prior to the start of the sample window. On the other hand, if the present page is active, step S417 determines whether the scanline offset counter is equal to 0.

If the scanline offset counter is equal to 0, step S418 sets the slowscan start window flag to 1. On the other hand, if the scanline offset counter is not equal to 0, step S419 resets the slowscan start window flag to equal 0. The process then determines when the next linesync active signal is received at step S420. If the linesync signal is active, step S421 decrements to the scanline offset counter.

Figure 24:
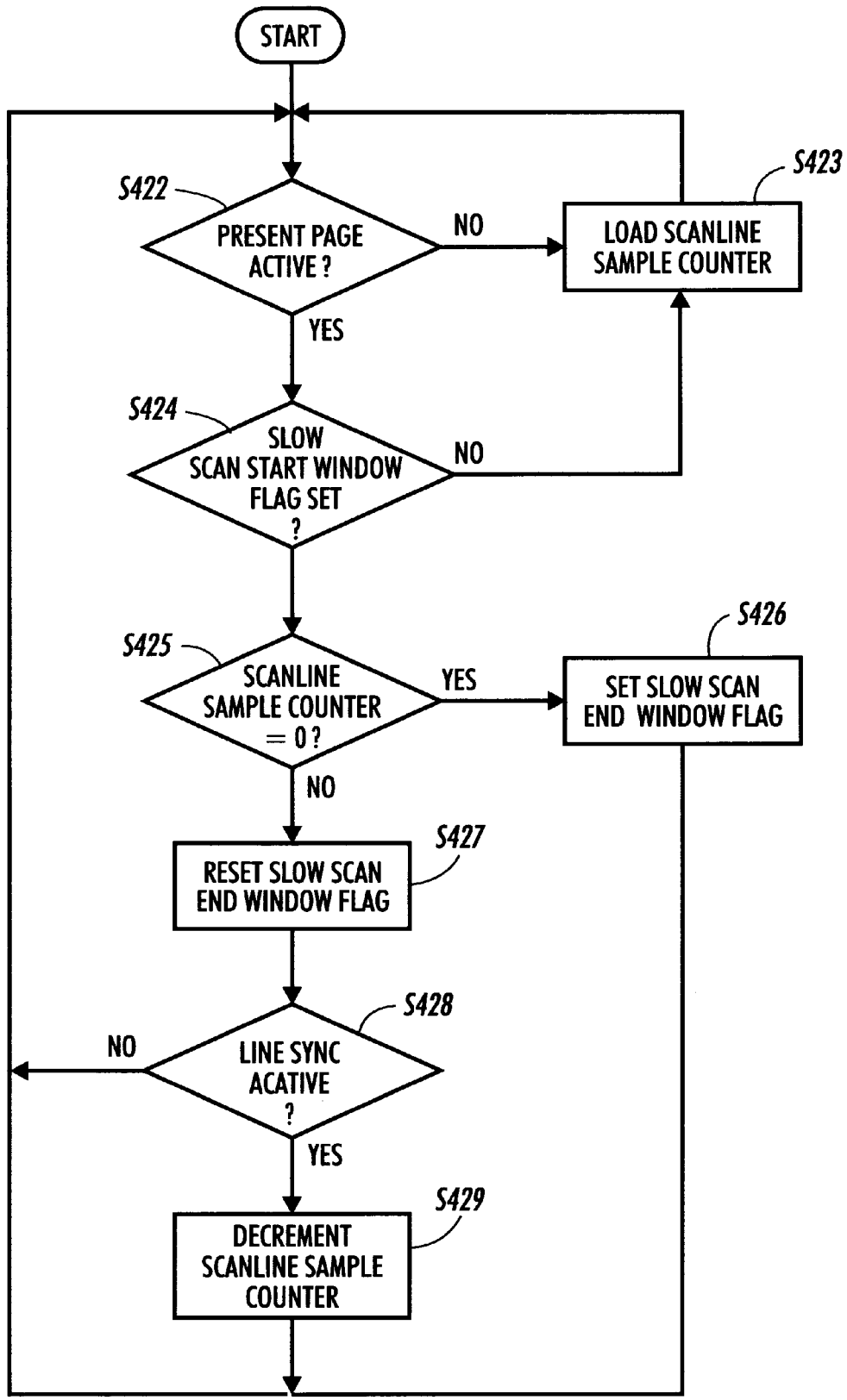
FIG. 24 is a flowchart illustrating the determination of which scanlines are to be sampled to generate the histogram data.

FIG. 24 illustrates a flowchart showing the determination of which scanlines form the actual sample window. As illustrated in FIG. 24, step S422 determines whether the present page is active. If the present page is not active, step S423 loads the scanline sample counter with a value equal to the number of scanlines making up the sample window. On the other hand, if the present page is active, step S424 determines whether the slowscan start window flag is set.

If this flag is set, step S425 determines whether the scanline sample counter is equal to 0. If the scanline sample counter is equal to 0, step S426 sets the slowscan end window flag to equal 1. However, if the scanline sample counter is not equal to 0, step S427 resets the slowscan end window flag to 0. Thereafter, step S428 determines whether the linesync signal is active. If the linesync signal is active, step S429 decrements the scanline sample counter.

Figure 25:
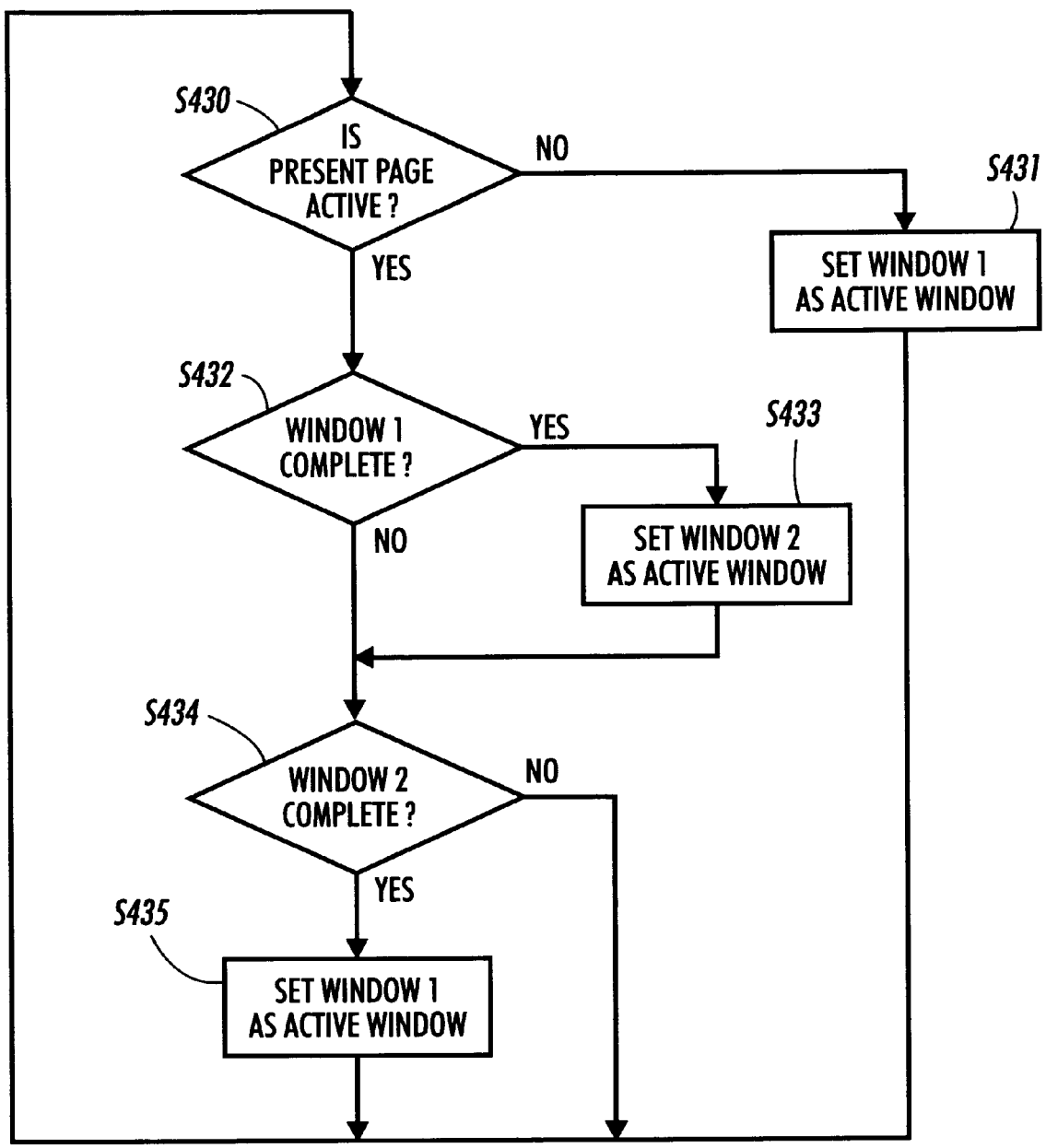
FIG. 25 is a flowchart illustrating a process for utilizing two windows to generate separate sets of histogram data.

FIG. 25 illustrates a flowchart showing the utilization of two sample windows wherein each sample window is utilized to generate a histogram for the values within the sample window such that separate background and black threshold values can be calculated for those areas corresponding to the sample window. As illustrated in FIG. 25, step S430 determines whether the present page is active. If the present page is not active, step S431 sets window 1 as the active window.

On the other hand, if the present page is active, step S432 determines whether the sampling of window 1 has been completed. If the sampling of window 1 has been completed, step S433 sets window 2 as the active window. However, if window 1 is not completed or step S433 sets window 2 as the active window, step S434 determines whether window 2 is complete. If window 2 is complete, step S435 sets window 1 as the active window.

As described above, FIG. 25 illustrates a process for utilizing two sample windows to generate histograms in a ping-pong fashion or mode. More specifically, in this ping-pong mode, each histogram is be used to calculate the white background value and the black threshold value for the image within the sample window. The white background value and the black threshold value will be calculated from the first sample window, while the second sample window is gathering histogram information. When the second sample window is completed, the white background value and the black threshold value will be calculated from the second histogram, while the first sample window is again being used to gather histogram information.

In this manner, the white background value and the black threshold value will be updated dynamically throughout the page with the histogram compilation "ping-ponging" between the two histogram distributions and sample windows. This "ping-pong" mode is useful in sampling a very large document such as an engineering drawing. In this mode, the two sample windows do not overlap. Sample window counters are simply held reset until the other sample window is completed. This saves having to use large counters and comparators. Moreover, the sample windows may still be specified with pixel and scanline offsets wherein the counting for the scanline offset of one sample window will not begin until the prior sample window has been completed.

In addition to having the capability of establishing the size of the sample window for generating the histogram data, the present invention is also capable of reducing the number of samples actually utilized within the sample window to create the histogram data, without losing histogram information. This capability is valuable when the total number of samples within a sample window exceeds the capacity of the histogram buffer. For example, if the user selects a sample window which contains 12,000 pixels but the histogram buffer has only a capacity for 3,000 pixels, the present invention randomly samples only 3,000 of the 12,000 pixels within the sample window to create the histogram distribution. This reduction in the number of the samples taken from the sample window will be described in more detail below with respect to FIGS. 29–31.

Figure 31:
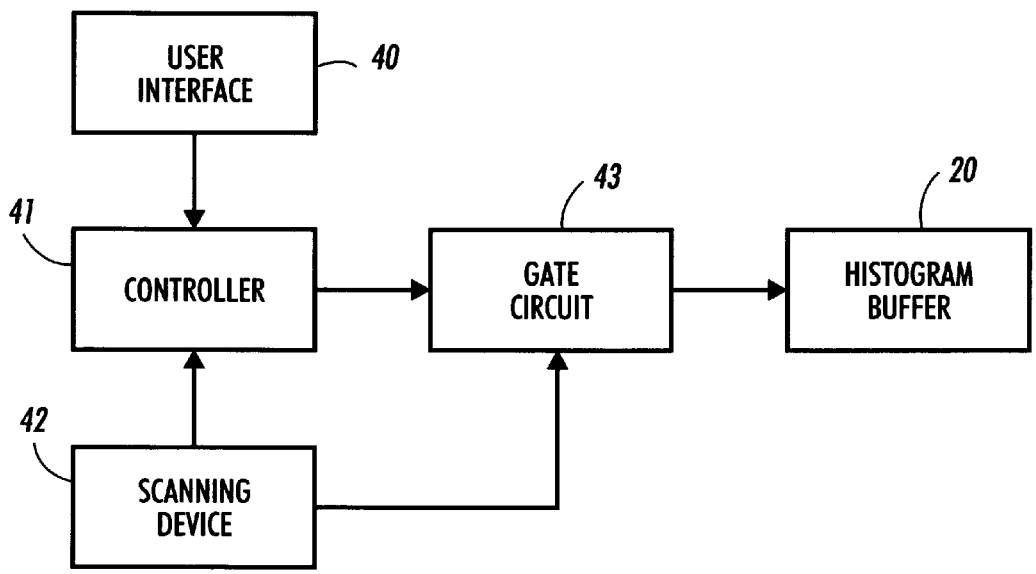
FIG. 31 is a block diagram illustrating the overall system for generating histogram data according to the present invention.

FIG. 31 illustrates a block diagram showing a system which is capable of selecting a number of samples from a sample window for generating the histogram distribution wherein the number of selected pixels is less than the total number of pixels within the sample window.

As illustrated in FIG. 31, the user interface 40 is provided so that the user can establish the location and size of the sample window to be utilized in generating the histogram data. The actual location and size of the sample window can be input utilizing various means such as a digital edit pad, number coordinates through a keyboard, or any other type of input device which allows the user to establish the location and size of the sample window. The system also includes a scanning device 42 which scans the actual image to be processed.

The scanning device 42 could also be utilized to establish the sample window by having the scanning device scan a separate document wherein a particular mark or set of marks can be utilized to define the sample window. For example, if the scanning device 42 is capable of recognizing certain colors, a color mark outlining the sample window's boundaries could be placed on a document and scanned by the scanning device such that a controller 41 would convert this information into coordinates representing the actual location and size of the sample window.

Upon receiving the location and size of the sample window form either the user interface 40 or scanning device 42, controller 41 compares the number of pixels within the sample window with the actual capacity of the histogram buffer. The actual number of pixels within the sample window can be calculated by the controller 41 from the scanning resolution selected for the image. If the controller 41 determines that the number of pixels within the sample window are equal to or less than the capacity of the histogram buffer, the controller 41 enables a gate circuit 43 to pass all pixels scanned by scanning device 42 within the sample window to be stored in histogram buffer 20.

However, if controller 41 determines that the number of pixels in the sample window exceeds the capacity of the histogram buffer 20, the controller 41 causes the gate circuit 43 to select only certain pixels from the scanning device 42 which are within the sample window such that only these certain pixels are stored by the histogram buffer 20. The actual selection process is realized by the controller creating a predetermined number of subsample windows within the sample window related to the ratio of the total number of pixels in the sample window to the actual capacity of the histogram buffer.

Once the sample windows are created, the controller 41 generates a random number for each subsample window wherein the random number corresponds to the actual size of the subsample window. each random number represents a specific pixel within the sample window. This random number, which is fed to the gate circuit 43, instructs the gate circuit 43 as to which pixel within the subsample window is to be stored by the histogram buffer 20. Examples of this process are illustrated in FIGS. 29 and 30.

Figure 29:
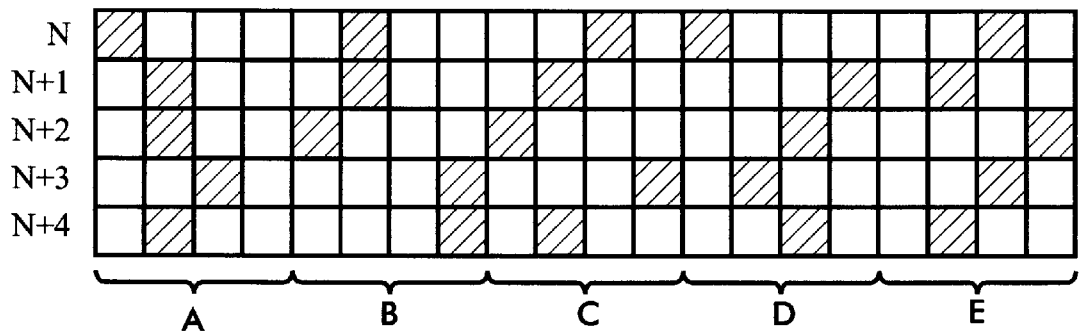
FIG. 29 is a graphical representation of pixels being sampled for a histogram wherein only 25 percent of the scanned image is sampled.
Figure 30:
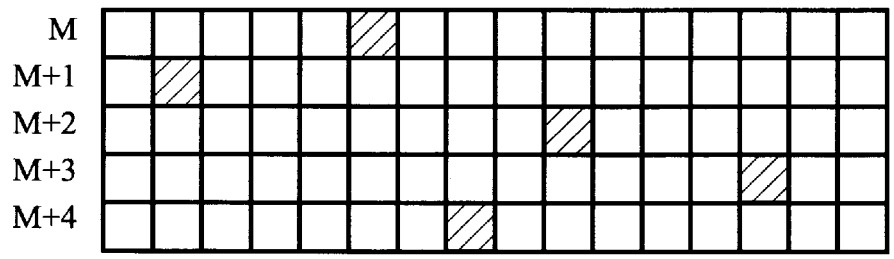
FIG. 30 is a graphical representation of the pixels being sampled for a histogram wherein 6.125 percent of the pixels of the scanned in image are sampled.

FIG. 29 illustrates a situation where the number of pixels in the sample window exceeds the capacity of the histogram buffer such that the controller 41 determines that only ¼ of the pixels within the original sample window are passed on by the gate circuit 43 to the histogram buffer 20. To determine which pixels are passed to the histogram buffer 20, the controller 41 generates a number of subsample windows within the sample window wherein each subsample window has an area corresponding to 4 pixels. Thereafter, the controller 41 generates a random number corresponding to the size of the subsample window.

In the example illustrated in FIG. 29, the random number would be between 1 and 4 wherein each random number corresponds to a particular pixel within the subsample window. This random number is conveyed to the gate circuit 43 such that when the gate circuit 43 receives the pixel from scanning device 42 that corresponds to the random number, the image data associated with the pixel is passed on to the histogram buffer 20. Each darkened pixel illustrated in FIG. 29 represents the pixel within the subsample window selected by gate circuit 43 according to the random number generated by controller 41.

Figure 9:
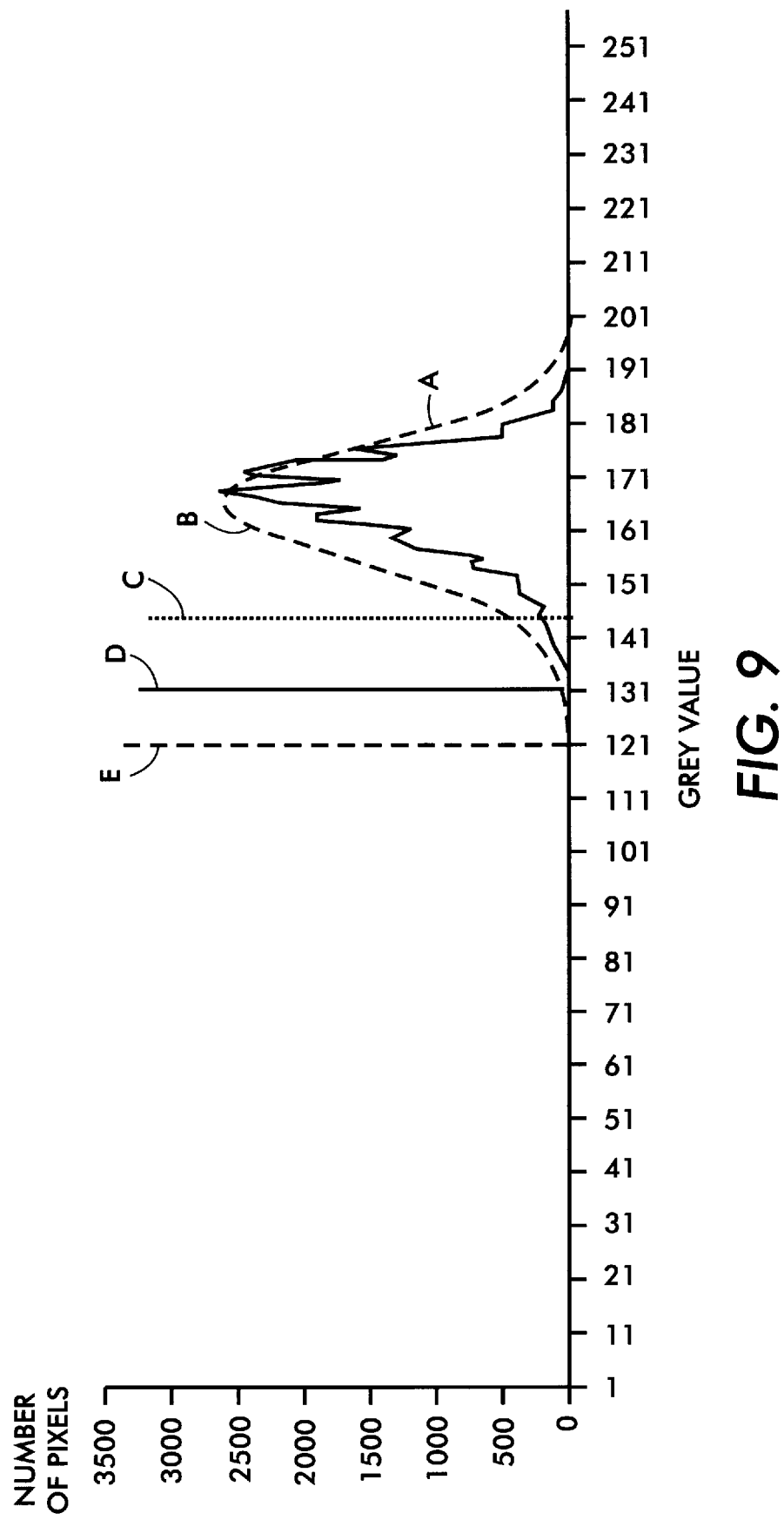
FIG. 9 is a graphical representation illustrating a histogram distribution with many spikes.

In preferred embodiment of the present invention, as illustrated in FIG. 9, the subsample window has a width of only a single scanline. In other words, as illustrated in FIG. 29, the subsample window has a 4×1 pixel to scanline dimension; however, the subsample window could also have a 2×2 pixel to scanline dimension.

Furthermore, as illustrated in FIG. 29, in the subsample window A for scanline N, the controller 41 generates a random number equal to 1 such that the first pixel in the subsample window A is selected by the gate circuit 43 to be passed onto the histogram buffer 20. In the subsample window B for scanline N, the controller 41 generates a random number equal to 2 such that the second pixel within the subsample window B is passed onto histogram buffer 20. Additionally, in the subsample window C illustrated in FIG. 29 for scanline N+3, the controller 41 has generates a random number equal to 4 such that the first pixel within the subsample window C is passed on by the gate circuit 43 to the histogram buffer 20. Lastly, for the subsample D window illustrated in FIG. 29 for the scanline N+4, the controller 41 has generated a random number equal to 3 such that the third pixel within the subsample window D is passed on by gate circuit 43 to histogram buffer 20.

Once the histogram data is compiled for a sample window, the bin values, each bin values is associated with a particular grey level value (in the preferred embodiment, the bin values range from 0 to 255 for an eight bit system), for the histogram are read initially from the high intensity (white) spectrum to the low intensity (black) area of the spectrum. The number of pixels at each level (the frequency) is compared to a running stored maximum The running stored maximum is updated until the slope of the background distribution in the histogram changes from a negative-slope to a positive-slope.

To determine this change in slope, the present invention examines the five neighboring histogram bin values on the positive-slope side of the stored maximum and the three neighboring histogram values on the negative-slope side of the stored maximum. If all eight neighboring bins have values lower than the stored maximum, the present invention declares the present bin value as the background peak for the image, the present bin as having the peak frequency. To accommodate for the possibility of adjacent bins having equal values, the neighborhood test can be modified such that the neighboring bins on either side of the suspected peak may also be allowed to be equal to the peak value in order to satisfy the test.

Moreover, to prevent a false positive with respect to peak identification, the bin value for this peak location is also compared to a threshold value. If the bin value for the peak location is greater than a threshold value, the peak value is allowed to be declared the background peak of the image. The threshold value may be any value determined by the user or can be predetermined in designing the system. For example, the threshold value may be about 1% of the total sample size when working with black and white images, or the threshold value may be the total sample size divided by 255 when working with colored images wherein the pixels are represented by 8-bits of image data.

To prevent mis-identification of a minor peak as background, once a peak has been found in the background distribution of the histogram, the present invention continues the search of the histogram data to look for an adjacent larger peak utilizing the same neighbor test described above. If a larger peak is found, and the present invention has not yet identified a valley location (the actual determination of the valley location will be described in more detail below), the present invention designates this new larger peak as the background peak.

Once a background or white peak has been found, the present invention sets a status flag, and the histogram address is reset to 255. The status flag corresponding to the finding of the white peak remains set until the start of a new page or a new sample window begins if the present invention is utilized in the above described ping-pong mode. If the present invention has reached the histogram address corresponding to 0, and a white peak has not been found, the present invention aborts the histogram process and assigns a default value to the background value.

The histogram is then read for a second time to find the quarter (¼) peak location. To find the ¼ peak value, the histogram address is reset to 255 and when the previously found white peak location is reached, subsequent histogram bin values are compared with this maximum peak value (peak frequency value) until a grey level is found which has a frequency value less than or equal to ¼ of the frequency value associated with the white peak location. Since, as discussed above, the typical histogram distribution closely resembles a normal Gaussian distribution, the determination of the quarter (¼) peak value represents a reasonable estimate of the two sigma points from the mean (peak) in the histogram. In other words, the grey level having a frequency less than or equal to ¼ the peak frequency represents a point that is 2 standard deviations away from the mean or peak point in the histogram distribution.

To ensure that the present invention has found the quarter (¼) peak frequency location, the present invention verifies that the three subsequent bin values have values less than or equal to the frequency value at the quarter (¼) peak location. Moreover, the present invention determines whether the difference between the quarter (¼) peak location and the white peak location is less than a threshold which may be programmable by the user. If the quarter (¼) peak location passes these two additional tests, the image background value can be determined from the peak frequency of the quarter (¼) peak location utilizing one of the formulas discussed below.

If the quarter (¼) peak frequency location cannot be determined because the background peak in the histogram is not dominant or there is another dominant mode in the histogram adjacent to the background mode, the present invention tries to find the grey level value which is one standard deviation away from the mean or peak value of the histogram. To find this grey level or peak location, the present invention also scans the histogram data to find the closest grey level which has a peak frequency equal to ⅝ of the peak frequency of the white peak.

It is noted that the difference in the number of grey levels between the white peak value and the grey level associated with ⅝ of the peak frequency value corresponds to the number of grey levels between the grey level associated with the ⅝ peak frequency and the grey level associated with the quarter (¼) peak frequency. Thus, the present invention determines an estimate for the quarter (¼) peak frequency location by utilizing the formula (2×⅝ peak)−peak. In other words, the present invention subtracts the grey level associated with the white peak from 2 times the grey level value associated with the ⅝ peak value. The results of this formula are used as an estimated grey level value for the ¼ peak frequency of the histogram distribution. The present invention also further verifies the validity of the ⅝ peak value by verifying whether the 3 subsequent histogram bin values have frequency values less than or equal to the frequency value associated with this grey level.

As noted above, there may be situations where the quarter (¼) peak value cannot be found by scanning the histogram data. This is also true with respect to the ⅝ peak frequency value. In the situation where neither the quarter (¼) peak frequency value or the ⅝ peak frequency value can be found, the quarter (¼) peak frequency value can be estimated by calculating the difference between the peak frequency and the quarter (¼) peak frequency value on the negative-slope side of the background distribution curve.

This negative-slope side (¼) quarter (¼) peak frequency value is determined in the same manner as the positive-slope side quarter (¼) peak frequency value except for when the histogram is scanned in this process, the histogram is scanned from the higher values to the lower values up until the white peak location value has been reached. The quarter (¼) peak frequency value is estimated from the negative-slope side quarter (¼) peak frequency value utilizing the following formula: (2*peak)−¼ negative peak. In other words, the estimated quarter (¼) peak frequency value is the difference between the grey level value associated with the negative-slope side quarter (¼) peak frequency value and twice the grey level value of the white peak location. It is noted that the process for determining the quarter (¼) peak frequency value on the negative-slope side of the background distribution curve utilizes the same circuitry as that used to determine the quarter (¼) peak frequency value on the positive-slope side of the background distribution curve.

In addition to finding the quarter (¼) peak frequency value, the present invention also finds the minimum or valley between the background peak location and an adjacent peak location (most commonly, the black distribution peak). Two potential problems necessitate the looking for a valley in the histogram which separates the background distribution from the rest of the image.

First of all, the present invention needs to know when to stop looking for the quarter (¼), or alternatively, the ⅝ peak frequency value. Secondly, there is often a dominant mode in the histogram next to the background distribution mode. If the background mode is not dominant or the quarter (¼) peak frequency location had to be estimated from either the ⅝ peak frequency value or the quarter (¼) peak frequency value on the negative-slope side of the background distribution curve, it is possible for the estimated quarter (¼) peak location to be lower than the valley between the two distribution modes. In such a situation, the background value would be located on the slope of the adjacent mode, thus adversely effecting the quality of the image when reproduced.

To determine a valley location, the present invention utilizes the same method of looking at neighboring bin values as when locating the white peak value. However, in this situation, the present invention looks for a minimum instead of a maximum. Since the present invention utilizes the same method, the same hardware may be shared when determining the peak or the value.

In the preferred embodiment of the present invention, once the white peak value has been found, the present invention starts looking for the valley location. When the valley location has been found, a flag is set indicating that the valley location has been determined. To ensure that a proper valley location has been determined, the present invention also verifies that the valley location is at least a predetermined number of grey levels beyond the white peak location. If this valley location is not at least a predetermined number of grey levels beyond the white peak location, the present invention keeps looking for a valley until a valley value is found that meets this threshold test. This additional threshold test enables the present invention to accommodate most background distributions which are very spiky.

The peak values for the black distribution curve are determined in a similar manner. Once the background peak values are created, the bin values, each bin values is associated with a particular grey level value for the histogram are read initially from the low intensity (black) spectrum to the high intensity (white) area of the spectrum. The number of pixels at each level (the frequency) is compared to a running stored maximum. The running stored maximum is updated until the slope of the background distribution in the histogram changes from a positive-slope to a negative-slope.

To determine this change in slope, the present invention examines the five neighboring histogram bin values on the negative-slope side of the stored maximum and the three neighboring histogram values on the positive-slope side of the stored maximum. If all eight neighboring bins have values lower than the stored maximum, the present invention declares the present bin value as the black peak for the image, the present bin as having the peak frequency. To accommodate for the possibility of adjacent bins having equal values, the neighborhood test can be modified such that the neighboring bins on either side of the suspected peak may also be allowed to be equal to the peak value in order to satisfy the test.

Moreover, to prevent a false positive with respect to peak identification, the bin value for this peak location is also compared to a threshold value. If the bin value for the peak location is greater than a threshold value, the peak value is allowed to be declared the black peak of the image. The threshold value may be any value determined by the user or can be predetermined in designing the system. For example, the threshold value may be about 1% of the total sample size when working with black and white images, or the threshold value may be the total sample size divided by 255 when working with colored images wherein the pixels are represented by 8-bits of image data.

To prevent mis-identification of a minor peak as a black peak, once a peak has been found in the black distribution of the histogram, the present invention continues the search of the histogram data to look for an adjacent larger peak utilizing the same neighbor test described above. If a larger peak is found, the present invention designates this new larger peak as the black peak.

Once a black peak has been found, the present invention sets a status flag, and the histogram address is reset to 0. The status flag corresponding to the finding of the black peak remains set until the start of a new page or a new sample window begins if the present invention is utilized in the above described ping-pong mode. If the present invention has reached the histogram address corresponding to 255, and a black peak has not been found, the present invention aborts the histogram process and assigns a default value to the black threshold value.

The histogram is then read for a second time to find the quarter (¼) peak location. To find the ¼ peak value, the histogram address is reset to 0 and when the previously found black peak location is reached, subsequent histogram bin values are compared with this maximum peak value (peak frequency value) until a grey level is found which has a frequency value less than or equal to ¼ of the frequency value associated with the black peak location. Since, as discussed above, the typical histogram distribution closely resembles a normal Gaussian distribution, the determination of the quarter (¼) peak value represents a reasonable estimate of the two sigma points from the mean (peak) in the histogarrm In other words, the grey level having a frequency less than or equal to ¼ the peak frequency represents a point that is 2 standard deviations away from the mean or peak point in the histogram distribution.

To ensure that the present invention has found the quarter (¼) peak frequency location, the present invention verifies that the three subsequent bin values have values less than or equal to the frequency value at the quarter (¼) peak location. Moreover, the present invention determines whether the difference between the quarter (¼) peak location and the black peak location is less than a threshold which may be programmable by the user. If the quarter (¼) peak location passes these two additional tests, the image black value can be determined from the peak frequency of the quarter (¼) peak location utilizing one of the formulas discussed below.

If the quarter (¼) peak frequency location cannot be determined because the black peak in the histogram is not dominant or there is another dominant mode in the histogram adjacent to the black mode, the present invention tries to find the grey level value which is one standard deviation away from the mean or peak value of the histogram. To find this grey level or peak location, the present invention also scans the histogram data to find the closest grey level which has a peak frequency equal to ⅝ of the peak frequency of the black peak.

It is noted that the difference in the number of grey levels between the black peak value and the grey level associated with ⅝ of the peak frequency value corresponds to the number of grey levels between the grey level associated with the ⅝ peak frequency and the grey level associated with the quarter (¼) peak frequency. Thus, the present invention determines an estimate for the quarter (¼) peak frequency location by utilizing the formula (2×⅝ peak) —peak. In other words, the present invention subtracts the grey level associated with the white peak from 2 times the grey level value associated with the ⅝ peak value. The results of this formula are used as an estimated grey level value for the ¼ peak frequency of the histogram distribution. The present invention also further verifies the validity of the ⅝ peak value by verifying whether the 3 subsequent histogram bin values have frequency values less than or equal to the frequency value associated with this grey level.

As noted above, there may be situations where the quarter (¼) peak value cannot be found by scanning the histogram data. This is also true with respect to the ⅝ peak frequency value. In the situation where neither the quarter (¼) peak frequency value or the ⅝ peak frequency value can be found, the quarter (¼) peak frequency value can be estimated by calculating the difference between the peak frequency and the quarter (¼) peak frequency value on the positive-slope side of the black distribution curve.

This positive-slope side quarter (¼) peak frequency value is determined in the same manner as the quarter (¼) peak frequency value except for when the histogram is scanned in this process, the histogram is scanned from the lower values to the higher values up until the black peak location value has been reached. The quarter (¼) peak frequency value is estimated from the positive-slope side quarter (¼) peak frequency value utilizing the following formula: (2*peak)—¼ positive peak.

In other words, the estimated quarter (¼) peak frequency value is the difference between the grey level value associated with the positive-slope side quarter (¼) peak frequency value and twice the grey level value of the black peak location. It is noted that the process for determining the quarter (¼) peak frequency value on the positive-slope side of the black distribution curve utilizes the same circuitry as that used to determine the quarter (¼) peak frequency value on the negative-slope side of the background distribution curve.

FIGS. 14 through 17 illustrate flowcharts showing a process carried out by the present invention to determine the various peak values with respect to finding the background or white threshold value and the black threshold value.

Figure 14:
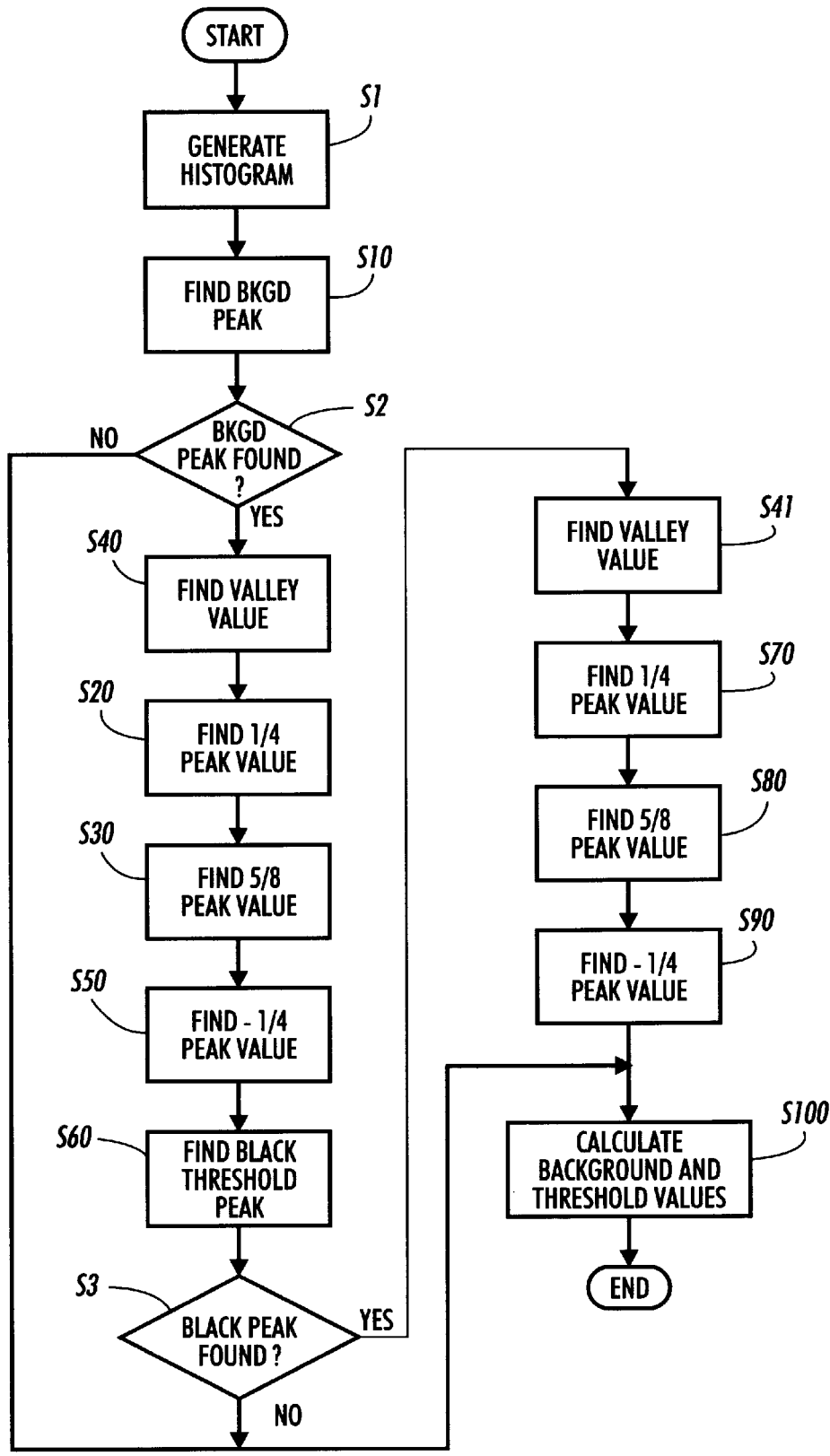
FIG. 14 is a flowchart illustrating an overall process for calculating the background value and black threshold value for a scanned image.

With respect to FIG. 14, FIG. 14 illustrates a simple flowchart showing the process carried out by the present invention in order to determine both the peak values for the background value determination and the peak values for the black threshold value determination. In this process, a histogram of the image to be processed, from either scanning the entire image or a sample window of the image, is generated at step S1. After the histogram is generated, the process scans the histogram data from the highest grey level to the lowest grey level to determine the background peak at step S10.

At step S2, the process determines whether a background peak value has been found. If a background peak value has been found, step S40 determines the valley value for the histogram data. Step S20 causes the histogram data to be rescanned so that the quarter (¼) peak value can be determined. Next, during this rescanning of the histogram data, step S30 determines the ⅝ frequency peak value. In a third scan of the histogram data, step S50 looks at the negative-slope of the background distribution curve to find the quarter (¼) peak value associated with the negative-slope side. Thereafter, step S60 causes the histogram data to be scanned from the lower grey level values to be higher grey level values so as to find the black peak value.

Step S3 determines whether the black threshold peak value has been found. If the black peak frequency value has been found, step S41 determines the valley value for the histogram data. Step S70 determines the quarter (¼) peak frequency value with respect to black peak frequency values. Thereafter, steps S80 and S90 find the ⅝ peak frequency value and the quarter (¼) peak frequency value on the positive-slope side, respectively. After going through these various process steps, the present invention, at step S100, calculates the background and black threshold values to be utilized in processing the image data for reproduction.

Figure 15:
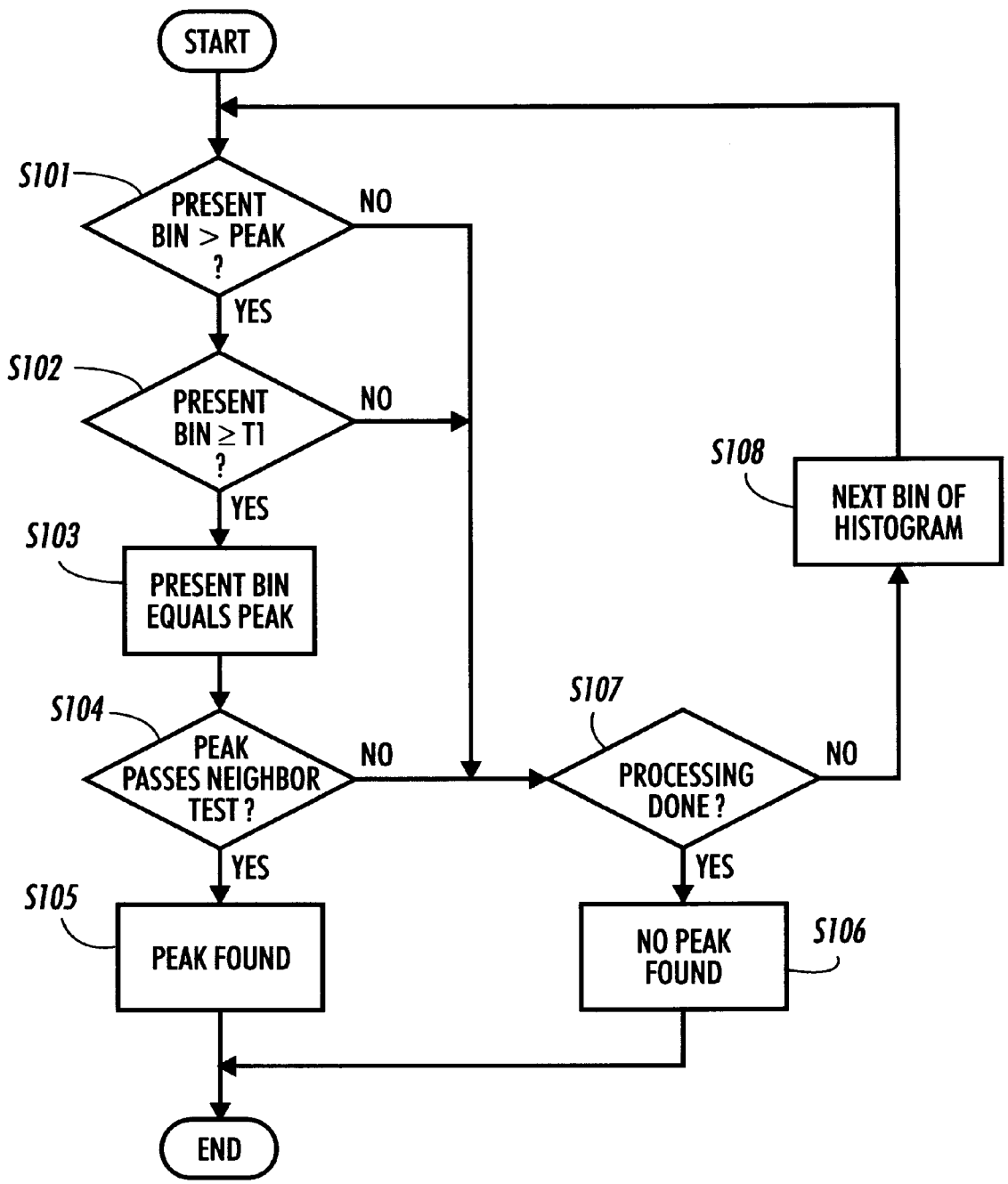
FIG. 15 is a flowchart illustrating the find peak subroutine of FIG. 9 for both the background peak value and the black threshold peak value.

FIG. 15 illustrates the process for determining either the background peak value or the black peak value. In this process, step S101 determines whether the frequency value of the present bin is greater than the frequency value of the running stored maximum. If the frequency value of the present bin is not greater than the running stored peak value, step S107 determines whether the processing of the histogram data has been completed.

If the processing of the histogram data has not been completed, step S108 retrieves the next bin value of the histogram in the process and returns to step S101. On the other hand, if step S107 determines that the processing of the histogram data is completed, step S106 sets a flag indicating that no peak value has been found.

If the frequency value of the present bin is greater than the running stored maximum frequency value, step S102 determines whether the present bin value is greater than a predetermined first threshold value. If the present bin value is greater than the predetermined first threshold value, step S103 stores the frequency value of the present bin as the new running stored maximum frequency value.

Figure 16:
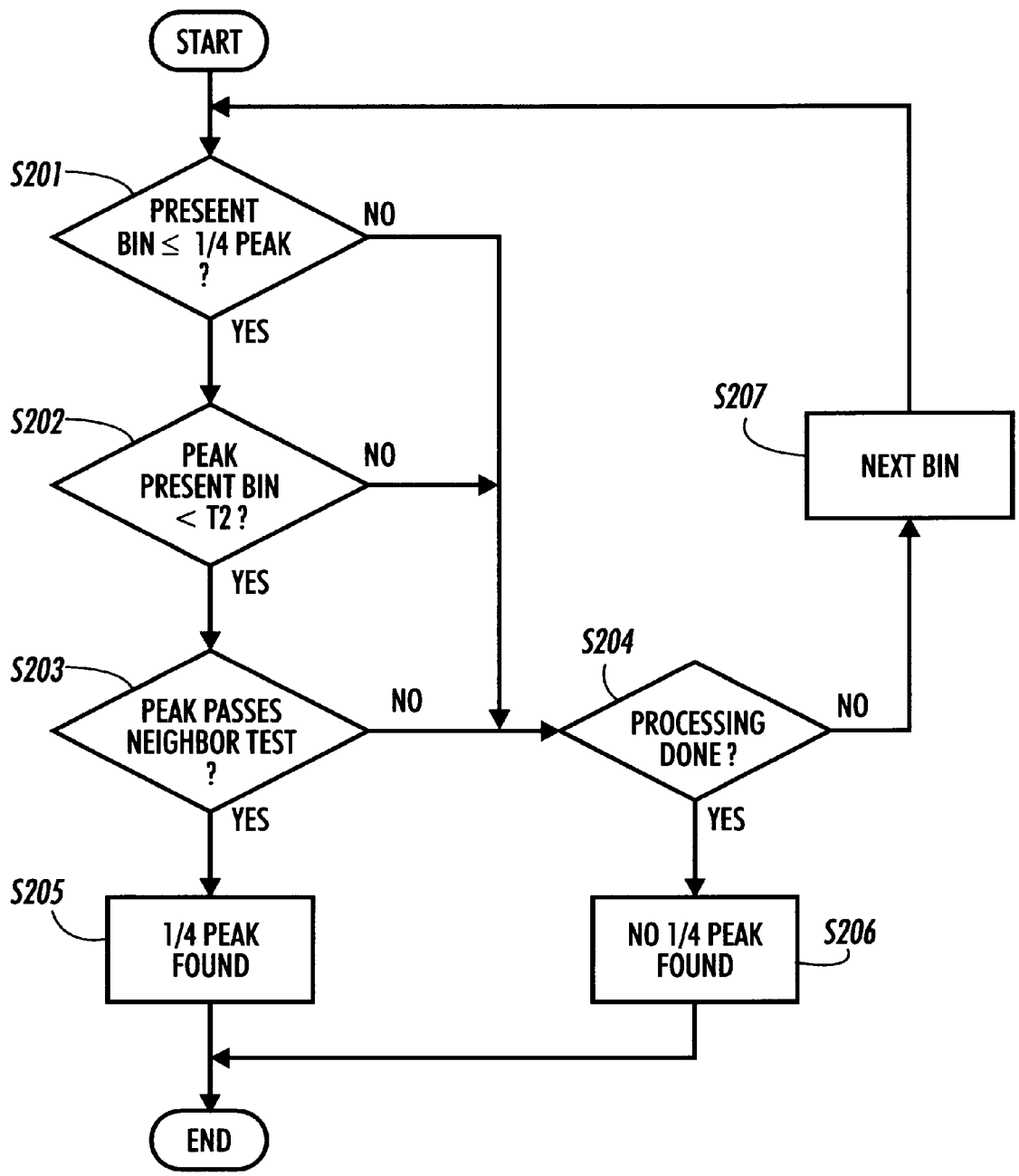
FIG. 16 is flowchart illustrating a subroutine for finding the quarter (¼) peak value for either the background value routine or the black threshold value routine.

The process then determines, at step S104, whether the frequency value of the present bin passes the neighbor test. If the neighbor test is passed, step S105 sets a flag indicating that the peak value has been found. FIG. 16 illustrates the process for determining either the ¼ background peak value or the ¼ black peak value. In this process, step S201 determines whether the frequency value of the present bin is less than or equal to ¼ of the frequency value of the peak. If the frequency value of the present bin is not less than or equal to ¼ of the frequency value of the peak, step S204 determines whether the processing of the histogram data has been completed.

If the processing of the histogram data has not been completed, step S207 retrieves the next bin value of the histogram in the process and returns to step S201. On the other hand, if step S204 determines that the processing of the histogram data is completed, step S206 sets a flag indicating that no ¼ peak value has been found.

If the frequency value of the present bin is less than or equal to the ¼ of the frequency value of the peak, step S202 determines whether the difference between the present bin value and the location of the peak value is less than a predetermined second threshold value. If the difference is less than the predetermined second threshold value, step S203 determines whether the frequency value of the present bin passes the neighbor test. If the neighbor test is passed, step S205 sets a flag indicating that the ¼ peak value has been found.

It is noted that the process illustrated in FIG. 16 can also be used to find the negative-slope and positive-slope ¼ peak values for the background and black distributions, respectively.

Figure 17:
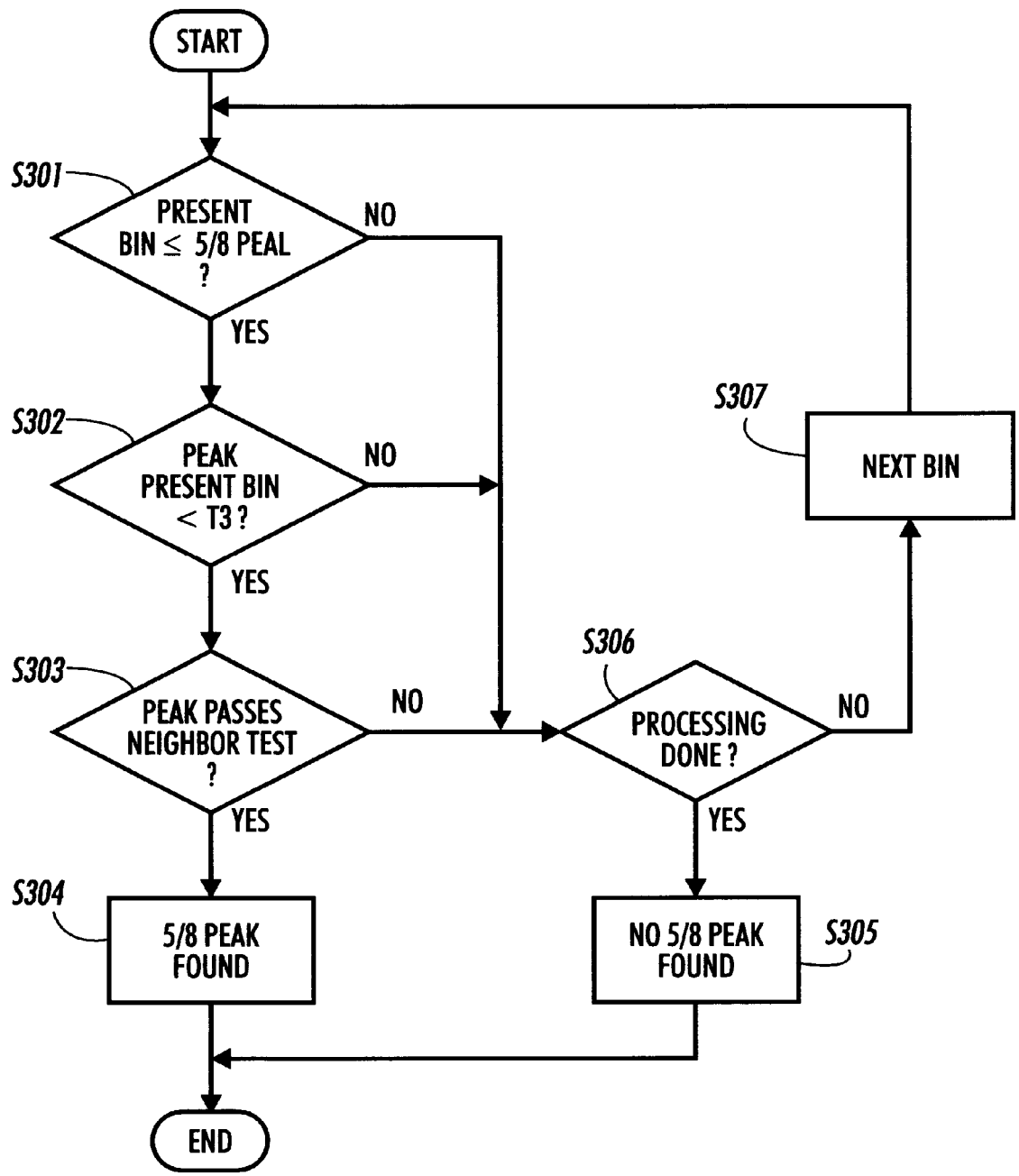
FIG. 17 is a flowchart illustrating a routine for finding the ⅝th peak value for either the background value process or the black threshold value process.

FIG. 17 illustrates the process for determining either the ⅝ background peak value or the ⅝ black peak value. In this process, step S301 determines whether the frequency value of the present bin is less than or equal to ⅝ of the frequency value of the peak. If the frequency value of the present bin is not less than or equal to ⅝ of the frequency value of the peak, step S306 determines whether the processing of the histogram data has been completed.

If the processing of the histogram data has not been completed, step S307 retrieves the next bin value of the histogram in the process and returns to step S301. On the other hand, if step S306 determines that the processing of the histogram data is completed, step S305 sets a flag indicating that no ⅝ peak value has been found.

If the frequency value of the present bin is less than or equal to the ⅝ of the frequency value of the peak, step S302 determines whether the difference between the present bin value and the location of the peak value is less than a predetermined third threshold value. If the difference is less than the predetermined third threshold value, step S303 determines whether the frequency value of the present bin passes the neighbor test. If the neighbor test is passed, step S304 sets a flag indicating that the ⅝ peak value has been found.

Figure 18:
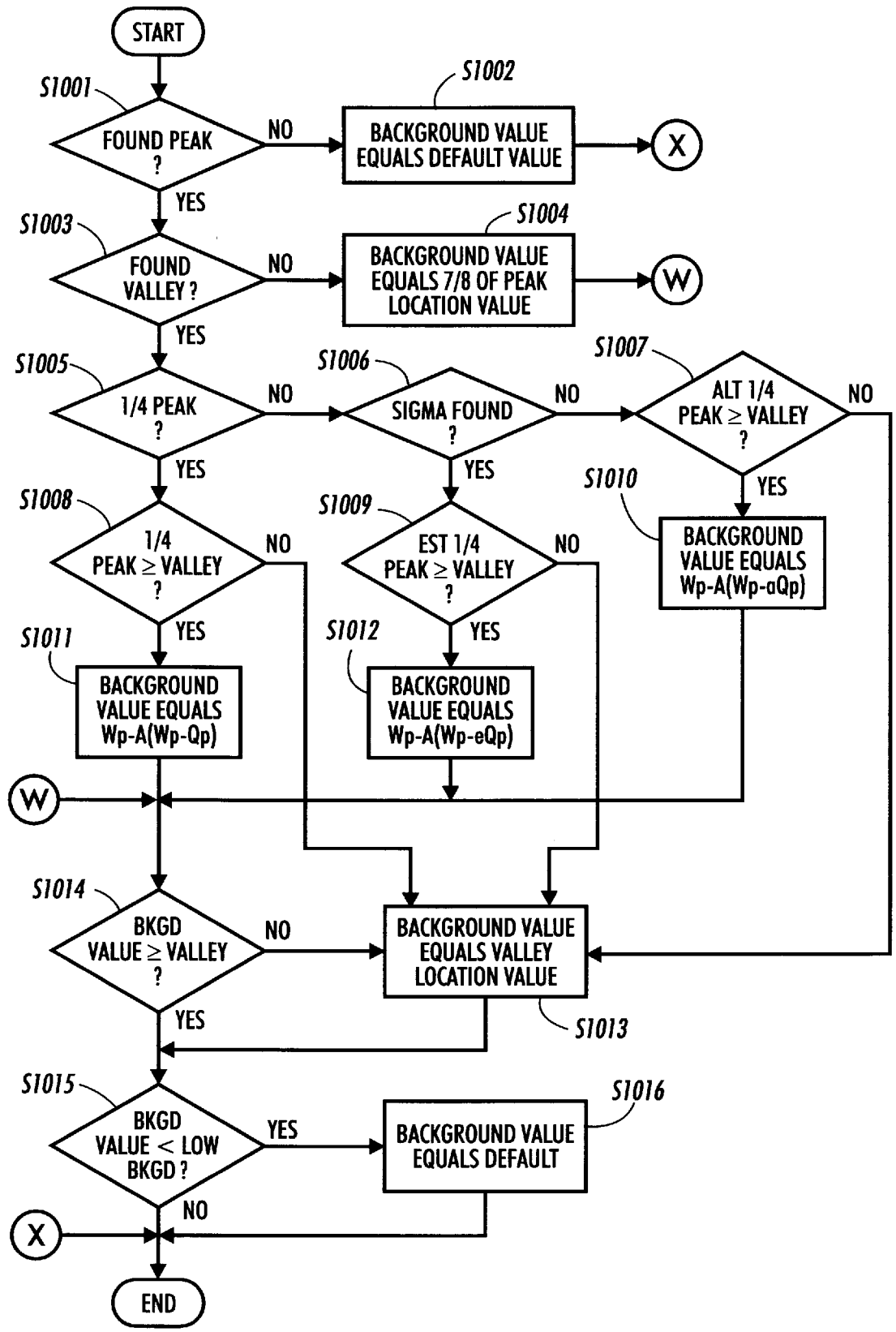
FIG. 18 is a flowchart illustrating the calculation of the background value from the histogram data.

Once the various peak values and valley values have been determined, FIG. 18 provides a process for calculating the actual background value to be utilized in processing the image. In the calculation process, step S1001 determines whether a background peak value has been found. If no background peak value was found, step S1002 sets the background value to be utilized in the image processing operation equal to a default value. On the other hand, if a background peak value has been found, step S1003 determines whether a valley value has been determined. If a valley value has not been found, step S1004 sets the background value for processing equal to ⅞ of the peak location value.

If a valley value has been found, step S1005 determines whether a quarter (¼) peak value was found. If a quarter (¼) peak value was found, step S1008 determines whether a quarter (¼) peak value is greater than or equal to the valley value. If the quarter (¼) peak value is not greater than or equal to the valley value, step S1013 sets the background value for the image processing operation equal to the valley location value. On the other hand, if the quarter (¼) peak value is greater than or equal to the valley value, step S1011 calculates the background value to be equal to the peak value minus a scalar times the difference between the peak value minus the quarter (¼) peak value, Wp-A(Wp-Qp). The scalar A is the value which is programmable by the user to allow the user to choose the background value to be anywhere between 2 and 4 standard deviations from the peak value.

After this background value has been calculated, step S1014 determines whether the calculated background value is greater than or equal to the valley value. If the background value is less than the valley value, step S1013 makes the background value equal to the valley location value. On the other hand, if the background value is greater than or equal to the valley value, step S1015 determines whether the background value is less than a threshold value corresponding to the lowest desirable background value. If the background value is less than the desirable lowest background value, step S1016 sets the background value to be equal to a default value.

If step S1005 determines that a quarter (¼) peak value was not found, step S1006 determines whether a sigma value or the ⅝ peak value was found. If the ⅝ peak value was found, step S1009 determines whether the estimated quarter (¼) peak value associated with the ⅝ peak value is greater than or equal to the valley value. If step S1009 makes a positive determination, step S1012 calculates the process background value to be equal to the white peak value minus a scalar times the difference between the white peak value and the estimated quarter (¼) peak value, Wp-A(Wp-eQp), and the process continues on to step S1014.

On the other hand, if step S1006 determines that the ⅝ peak value was not found, step S1007 determines whether the alternate quarter (¼) peak value, the quarter (¼) peak value associated with the negative-slope side of the distribution, is greater than or equal than the valley value. If step S1007 makes a positive determination, the process background value is calculated to be equal to the white peak value minus a scalar times the difference between the white peak value and the alternate quarter (¼) peak value, Wp-A(Wp-aQp), and the process continues on to step S1014.

Figure 19:
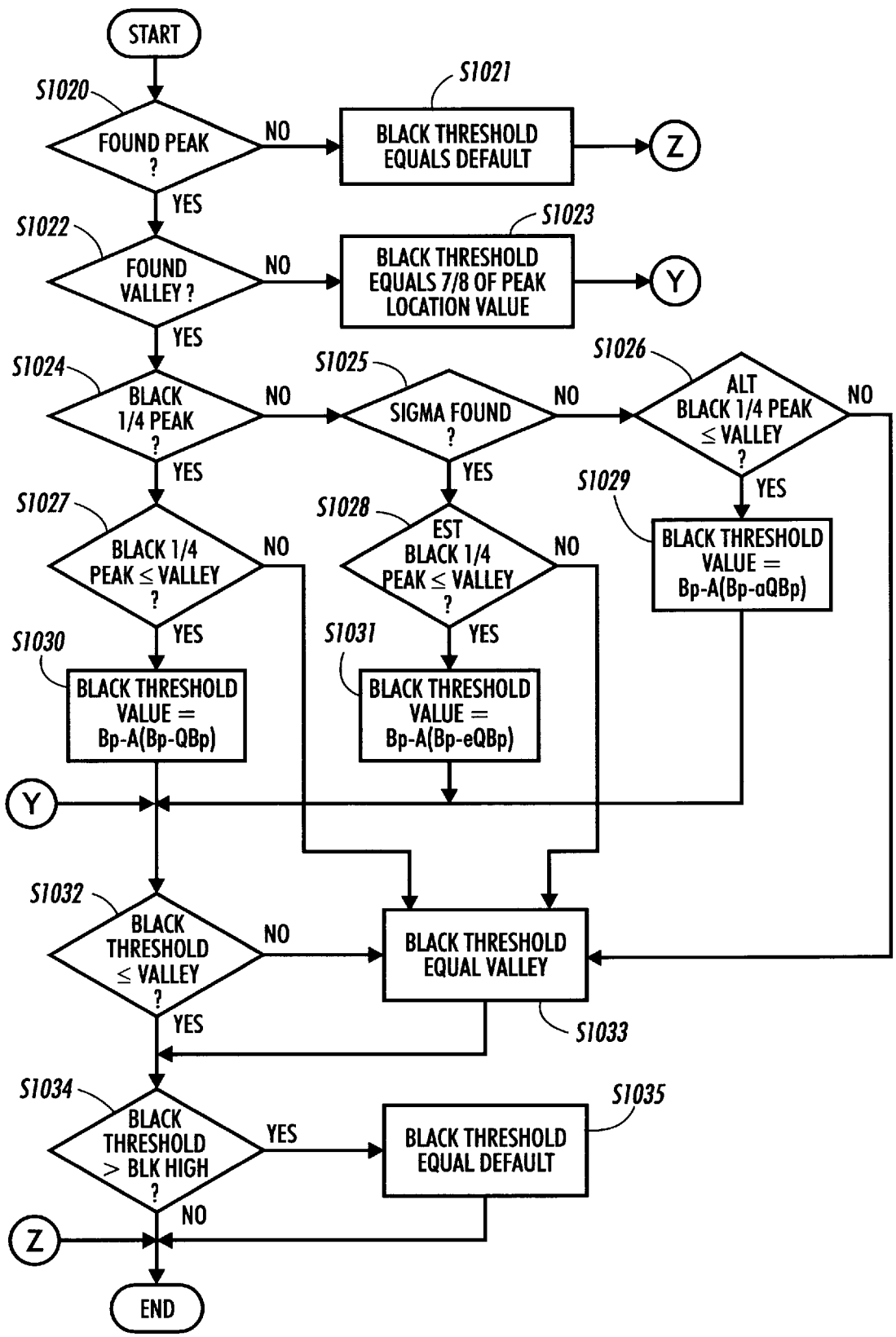
FIG. 19 is a flowchart illustrating the calculation of the black threshold value from the histogram data.

Moreover, once the various peak values and valley values have been determined, FIG. 19 provides a process for calculating the actual black threshold value to be utilized in processing the image. In the calculation process, step S1020 determines whether a black peak value has been found. If no black peak value was found, step S1021 sets the black threshold value to be utilized in the image processing operation equal to a default value. On the other hand, if a black peak value has been found, step S1022 determines whether a valley value has been determined. If a valley value has not been found, step S1023 sets the black threshold value for processing equal to ⅞ of the peak location value.

If a valley value has been found, step S1024 determines whether a quarter (¼) peak value was found. If a quarter (¼) peak value was found, step S1025 determines whether a quarter (¼) peak value is less than or equal to the valley value. If the quarter (¼) peak value is greater than the valley value, step S1033 sets the black threshold value for the image processing operation equal to the valley location value. On the other hand, if the quarter (¼) peak value is less than or equal to the valley value, step S1011 calculates the black threshold value to be equal to the black peak value minus a scalar times the difference between the black peak value minus the quarter (¼) peak value, Bp-A(Bp-QBp). The scalar A is the value which is programmable by the user to allow the user to choose the black threshold value to be anywhere between 2 and 4 standard deviations from the peak value.

After this black threshold value has been calculated, step S1032 determines whether the calculated black threshold value is less than or equal to the valley value. If the black threshold value is greater than the valley value, step S1033 makes the black threshold value equal to the valley location value. On the other hand, if the black threshold value is less than or equal to the valley value, step S1034 determines whether the black threshold value is greater than a threshold value corresponding to the highest desirable black threshold value. If the black threshold value is greater than the desirable lowest black threshold value, step S1035 sets the black threshold value to be equal to a default value.

If step S1024 determines that a quarter (¼) peak value was not found, step S1025 determines whether a sigma value or the ⅝ peak value was found. If the ⅝ peak value was found, step S1028 determines whether the estimated quarter (¼) peak value associated with the ⅝ peak value is less than or equal to the valley value. If step S1028 makes a positive determination, step S1031 calculates the process black threshold value to be equal to the black peak value minus a scalar times the difference between the black peak value and the estimated quarter (¼) peak value, Bp-A(Bp-eQBp), and the process continues on to step S1032.

On the other hand, if step S1025 determines that the ⅝ peak value was not found, step S1026 determines whether the alternate quarter (¼) peak value, the quarter (¼) peak value associated with the positive-slope side of the distribution, is less than or equal than the valley value. If step S1026 makes a positive determination, the process black threshold value is calculated to be equal to the black peak value minus a scalar times the difference between the black peak value and the alternate quarter (¼) peak value, Bp-A(Bp-aQBp), and the process continues on to step S1032.

Figure 26:
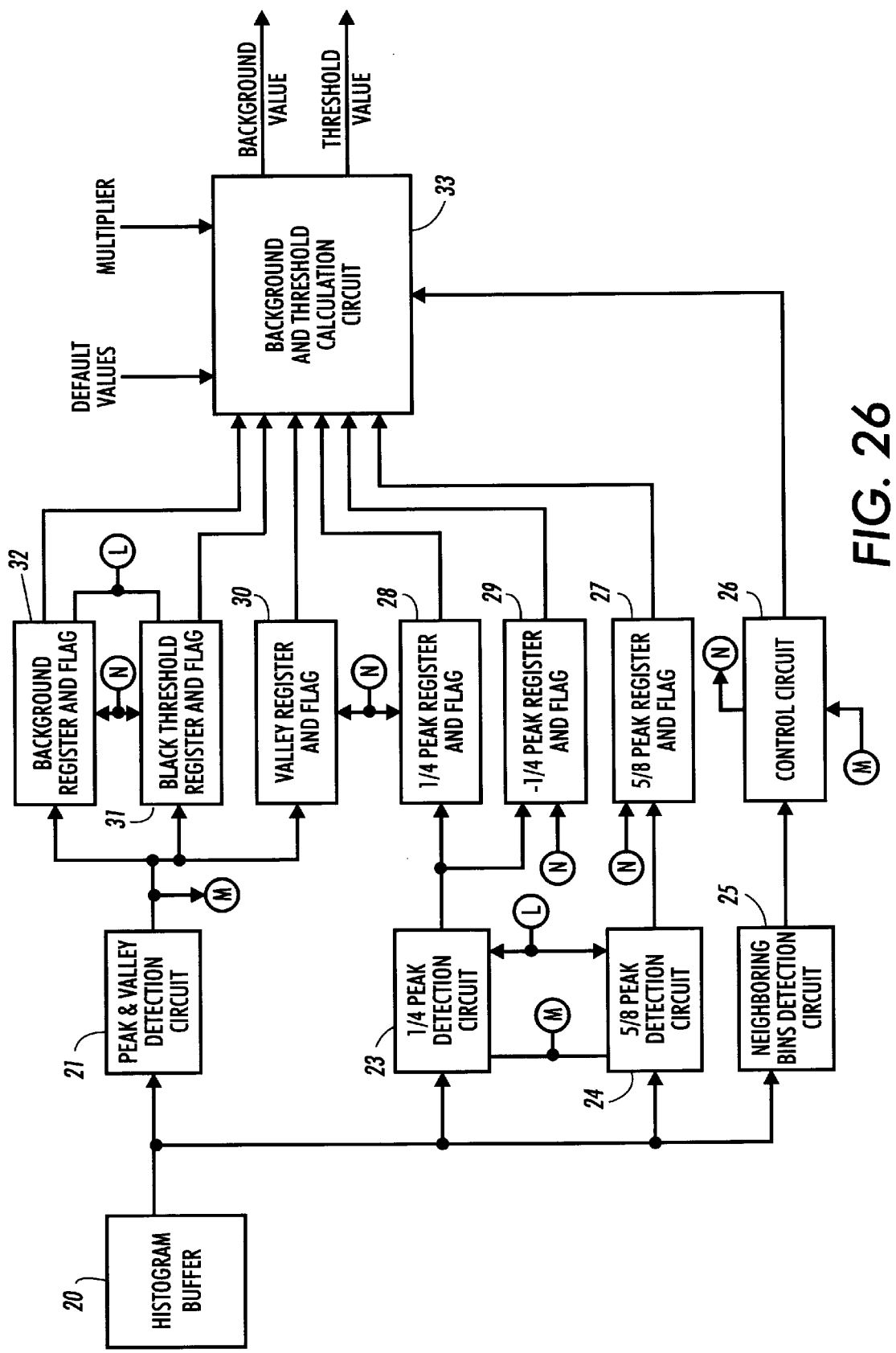
FIG. 26 is a block diagram illustrating a circuit for calculating the background and threshold values from histogram data.

FIG. 26 illustrates a block diagram showing the circuitry utilized by the present invention to determine the background and black threshold values to be utilized when processing the scanned image. As illustrated in FIG. 26, histogram data is stored in a histogram buffer 20. This histogram data is fed to a peak and valley detection circuit 21, a quarter (¼) peak detection circuit 23, a ⅝ peak detection circuit 24, and a neighboring bins detection circuit 25.

Peak and valley detection circuit 21 determines whether the present bin's frequency value is greater than a running stored maximum frequency value. If the peak and valley detection circuit 21 determines that the present bin's frequency value is greater than the running stored maximum frequency value, a signal is sent to a control circuit 26. In parallel with this peak and valley detection circuit's operation, the neighboring bins detection circuit 25 is determining whether the present bin passes the neighboring bins test as described above.

If the present bin passes the neighboring bins test, and the peak and valley detection circuit 21 has detected a peak, the control circuit 26 sends a signal to either the background register and flag circuit 32 or the black threshold register and flag circuit 31 so that these circuits can register either a background value or a black threshold value depending on whether the present process is determining the background value or the black threshold value.

Moreover, if the peak and valley detection circuit 21 determines that the present bin is less than a running stored minimum frequency value and the neighboring bin's detection circuit 25 determines that the present bin passes the neighboring bins valley detection test, the control circuit 26 sends a signal to a valley register and flag circuit 30 so that the present bin value can be registered as the valley value for the histogram.

Quarter peak detection circuit 23 determines whether the present bin's frequency value corresponds to 25% of the peak frequency value. If the quarter peak detection circuit 22 determines that the present bin's frequency value corresponds to 25% of the peak frequency value, a signal is sent to the control circuit 26. In parallel with this quarter peak detection circuit's operation, the neighboring bins detection circuit 25 is determining whether the present bin passes the neighboring bins test as described above.

If the present bin passes the neighboring bins test, and the quarter peak detection circuit 23 has detected a ¼ peak, the control circuit 26 sends a signal to either the ¼ peak register and flag circuit 28 or the -¼ peak register and flag circuit 29 so that these circuits can register either a ¼ peak value depending on which test is being performed. ⅝ peak detection circuit 24 determines whether the present bin's frequency value corresponds to ⅝ of the peak frequency. If the ⅝ peak detection circuit 24 determines that the present bin's frequency value corresponds to ⅝ of the peak frequency, a signal is sent to the control circuit 26. In parallel with this ⅝ peak detection circuit's operation, the neighboring bins detection circuit 25 is determining whether the present bin passes the neighboring bins test as described above.

If the present bin passes the neighboring bins test, and the ⅝ peak detection circuit 24 has detected a ⅝ peak, the control circuit 26 sends a signal to the ⅝ peak register and flag circuit so that this circuit can register the proper value.

Once all the various registers and flag circuits have been loaded and/or set, the control circuit 26 enables a background and black threshold calculation circuit 33 to calculate the background value and black threshold valley to be utilized in processing the image. The background and black threshold calculation circuit 33 also receive predetermined default values for either the background value or black threshold value as well as any scalar values preprogrammed by the user through a user interface.

Figure 27:
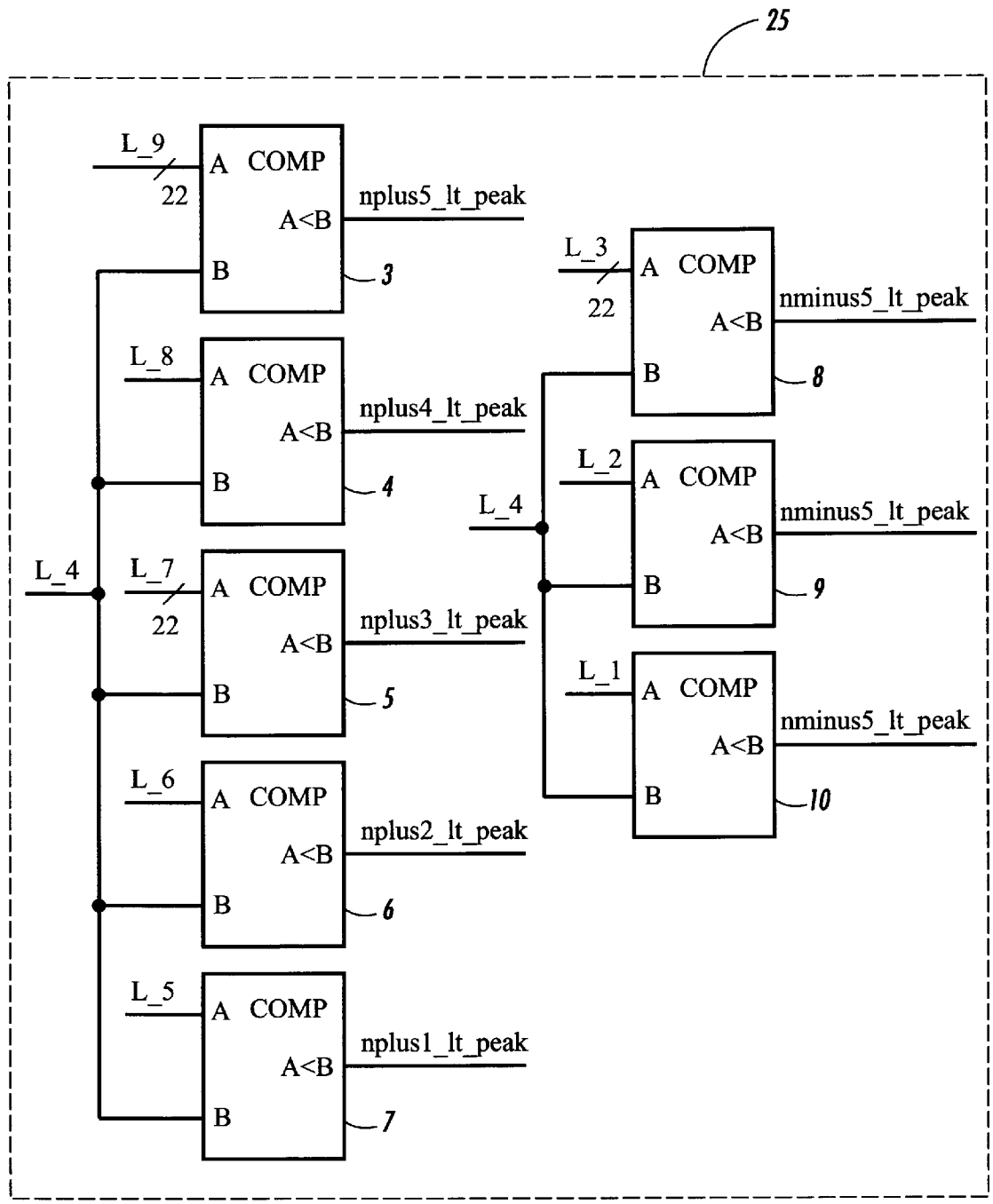
FIG. 27 is a block diagram illustrating the circuitry utilized in the neighboring bins test.
Figure 28:
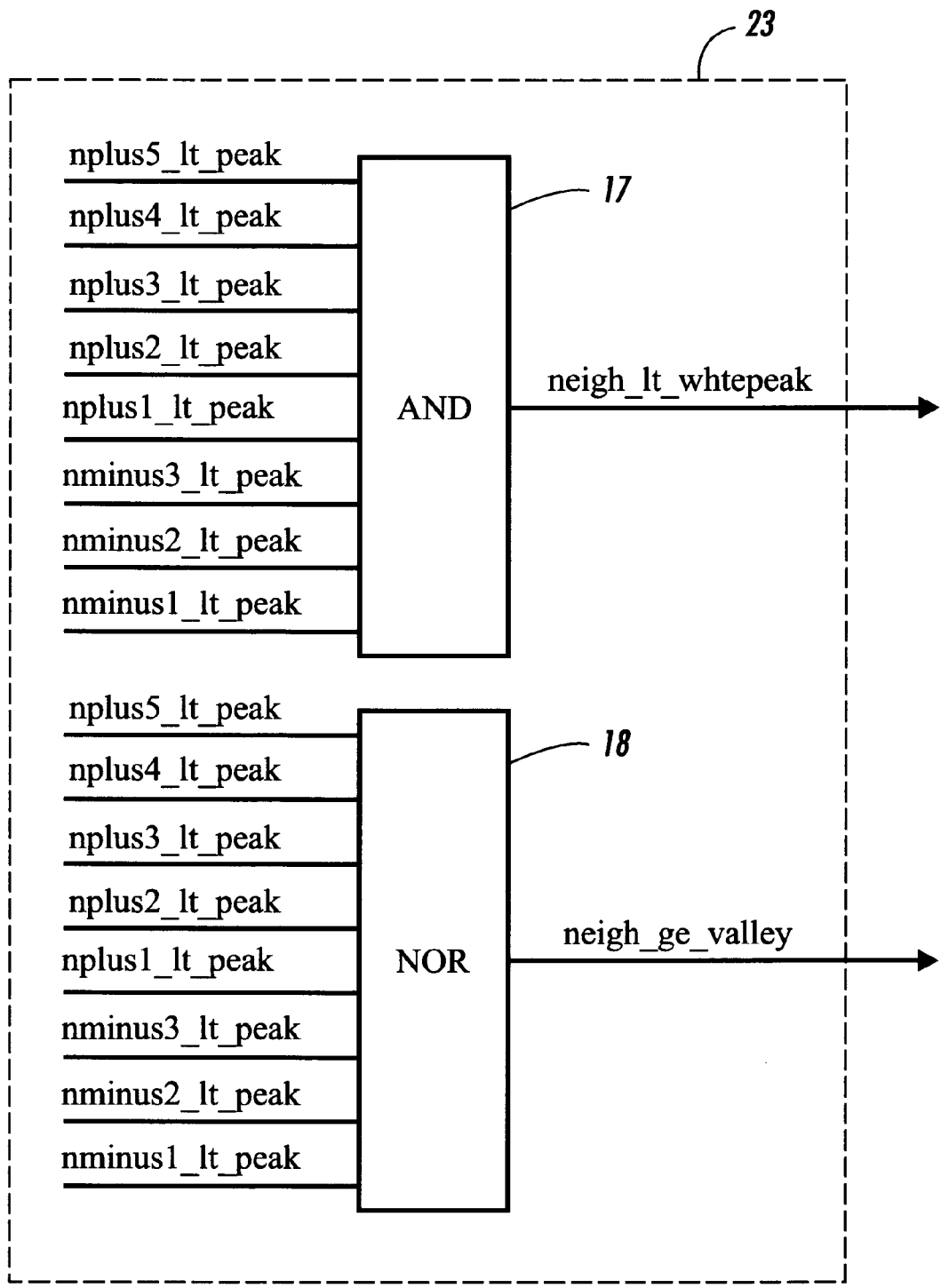
FIG. 28 is a block diagram showing the logic used to perform the neighboring bin test.

FIG. 27 illustrates a comparator circuit utilized in the neighboring bins detection circuit 25 wherein a plurality of comparators (3, 4, 5, 6, 7, 8, 9, and 10) produce signals indicating whether the present bin's value is greater than the neighboring bin values wherein 5 of the neighboring bin values are located on one side of the present bin value and 3 of the neighboring bin values are located on the other side from the present bin value. Once these various comparisons are complete, the comparisons are fed into the neighboring bins test circuits 17 and 18 as illustrated in FIG. 28.

Neighboring bin test circuit 17 determines whether the present bin's value is greater than the neighboring bin values. On the other hand, neighboring bin test circuit 18 determines whether the present bin's value is less than the neighboring bin values. In other words, neighboring bin test circuit 17 determines if the present bin's value is an actual peak value for the histogram, while neighboring bin test circuit 18 determines whether the present bin's value is an actual valley value for the histogram.

Examples of actual histograms analyzed utilizing the concepts of the present invention are illustrated in FIGS. 8–13.

Figure 8:
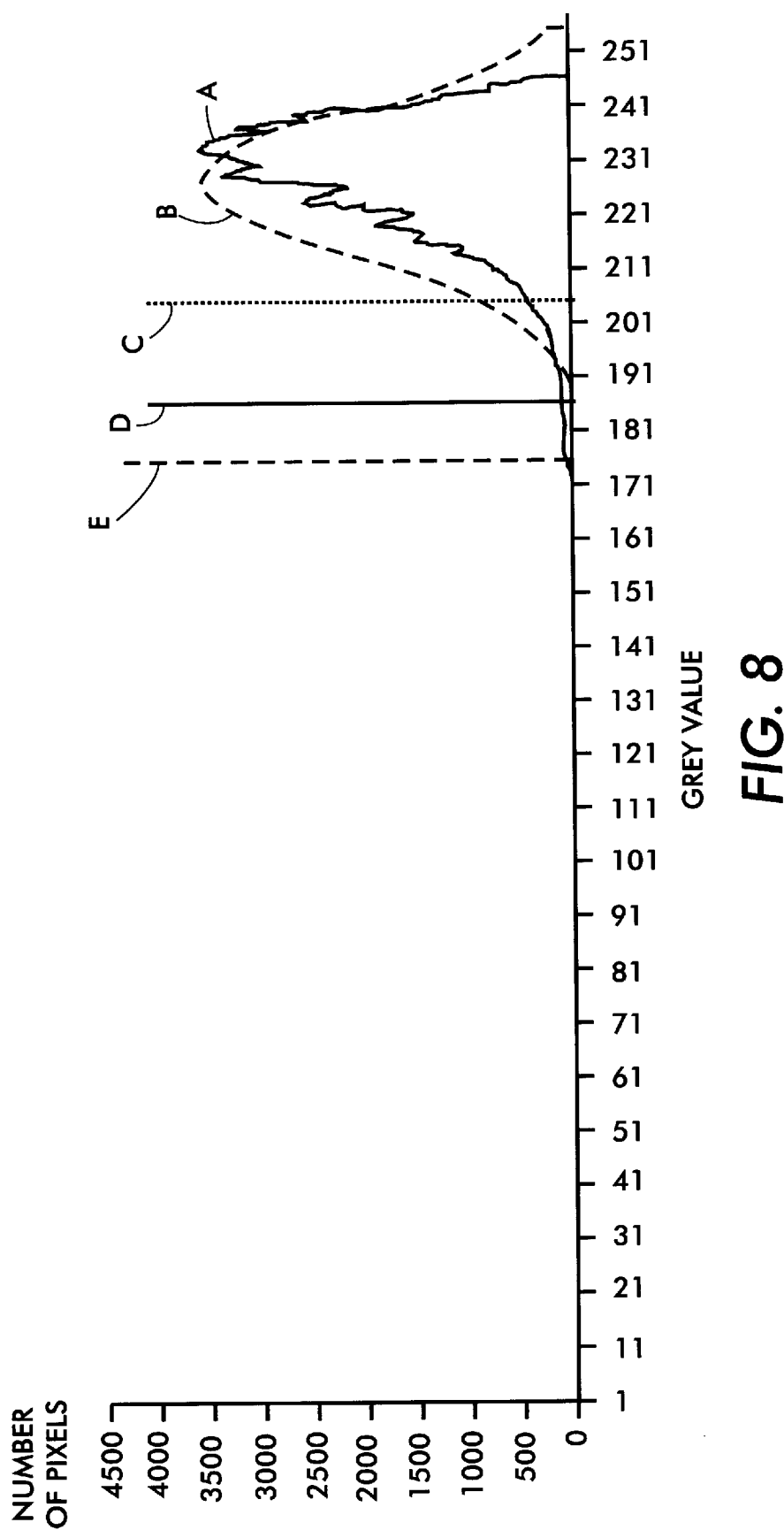
FIG. 8 is a graphical representation of a negatively skewed background distribution.

As noted above, FIG. 8 illustrates an example of a negatively skewed background distribution. This graphical representation illustrates the present invention's relative insensitivity to non-Gaussian distributions. As illustrated in FIG. 8, the histogram data is represented by line A, while a true histogram Gaussian approximation is represented by line B. Utilizing the concepts and processes of the present invention, the background peak value for the histogram illustrated in FIG. 8 was determined to be grey level 231. Moreover, when scanning the same image utilizing a sample window of the image, the peak grey value was also determined to be 231 by the present invention. Furthermore, as illustrated in FIG. 8, line C represents the four sigma point of the histogram from the sample window, while line D represents the four sigma point of the histogram distribution wherein the histogram is of the entire scanned image. Lastly, line E represents the four sigma point of the Gaussian approximation.

FIG. 9 illustrates an example of a histogram of an image which has created many spikes in the distribution. This Figure illustrates that the present invention did not identify any false peaks or valleys even though the distribution had many spikes.

As illustrated in FIG. 9, the histogram data is represented by line A, while a true histogram Gaussian approximation is represented by line B. Utilizing the concepts and processes of the present invention, the background peak value for the histogram illustrated in FIG. 9 was determined to be grey level 166. Moreover, when scanning the same image utilizing a sample window of the image, the peak grey value was also determined to be 166 by the present invention. Furthermore, as illustrated in FIG. 9, line C represents the four sigma point of the histogram from the sample window, while line D represents the four sigma point of the histogram distribution wherein the histogram is of the entire scanned image. Lastly, line E represents the four sigma point of the Gaussian approximation.

Figure 10:
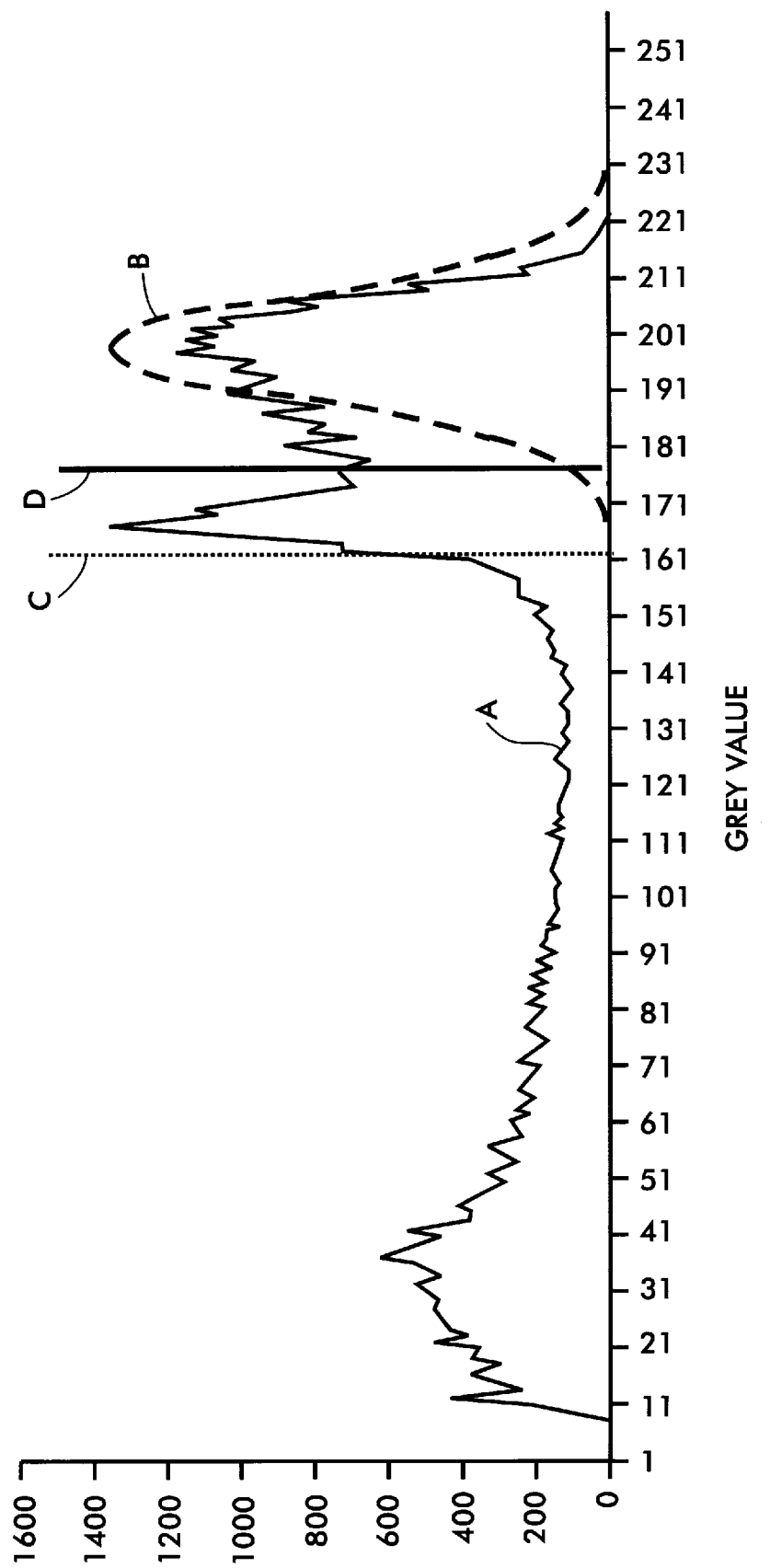
FIG. 10 is a graphical representation illustrating a histogram where the background value is less than an adjacent valley.

FIG. 10 is an example of a histogram where the background value is less than an adjacent valley. In such a situation, the background value is set equal to the valley value. In other words, the background value was set equal to line D. As illustrated in FIG. 10, the histogram data is represented by line A, while a true histogram Gaussian approximation is represented by line B. Utilizing the concepts and processes of the present invention, the background peak value for the histogram illustrated in FIG. 10 was determined to be grey level 199. Moreover, when scanning the same image utilizing a sample window of the image, the peak grey value was also determined to be 200 by the present invention. Furthermore, as illustrated in FIG. 10, line C represents the four sigma point of the histogram from the sample window, while line D represents the four sigma point of the histogram distribution wherein the histogram is of the entire scanned image.

Figure 11:
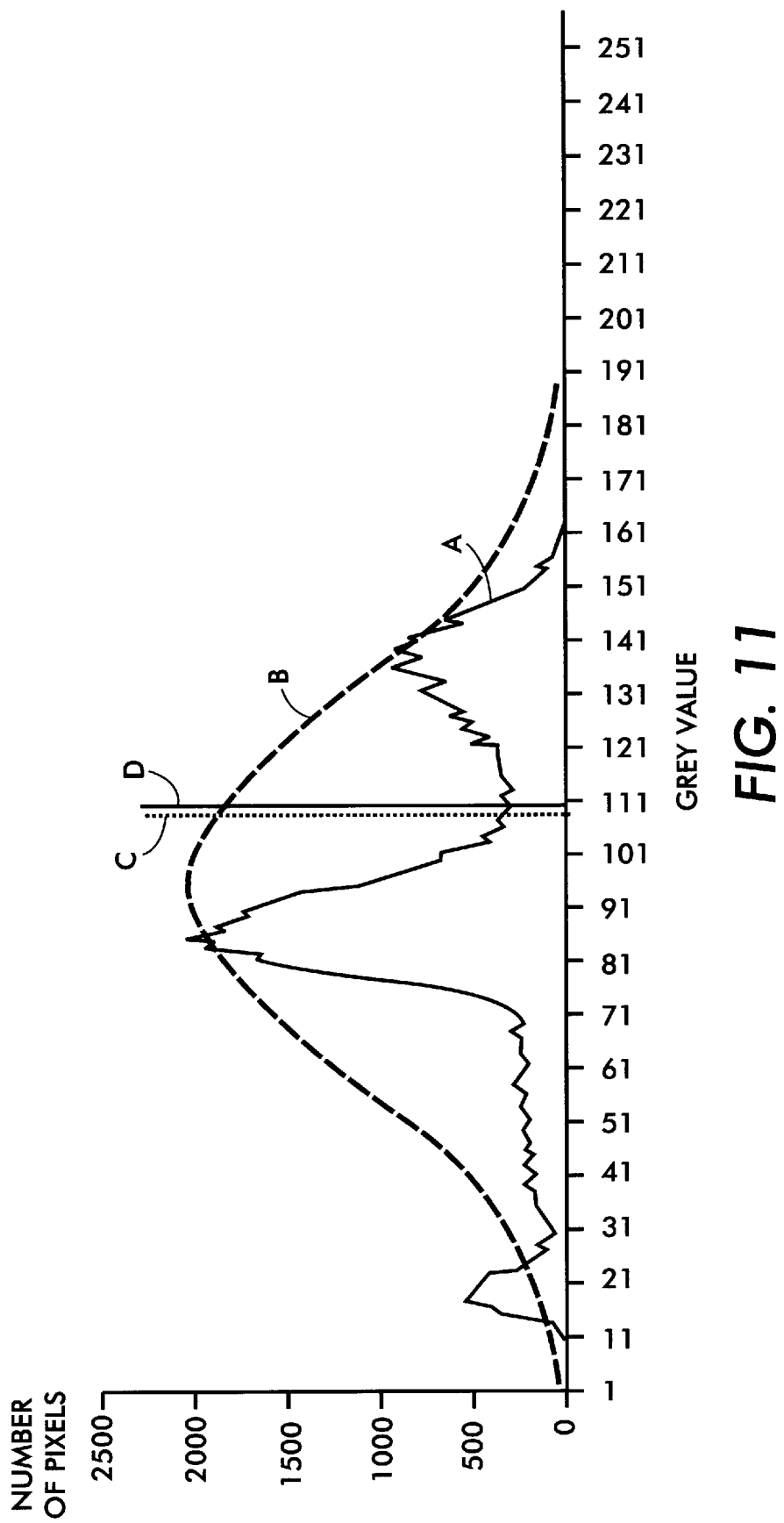
FIG. 11 is a graphical representation illustrating a histogram where the background value has to be estimated.

FIG. 11 illustrates an example of a histogram where the background value had to be estimated from the ⅝ peak value. As illustrated in FIG. 11, the histogram data is represented by line A, while a true histogram Gaussian approximation is represented by line B. Utilizing the concepts and processes of the present invention, the background peak value for the histogram illustrated in FIG. 11 was determined to be grey level 137. Moreover, when scanning the same image utilizing a sample window of the image, the peak grey value was also determined to be 136 by the present invention. Furthermore, as illustrated in FIG. 11, line C represents the four sigma point of the histogram from the sample window, while line D represents the four sigma point of the histogram distribution wherein the histogram is of the entire scanned image.

Figure 12:
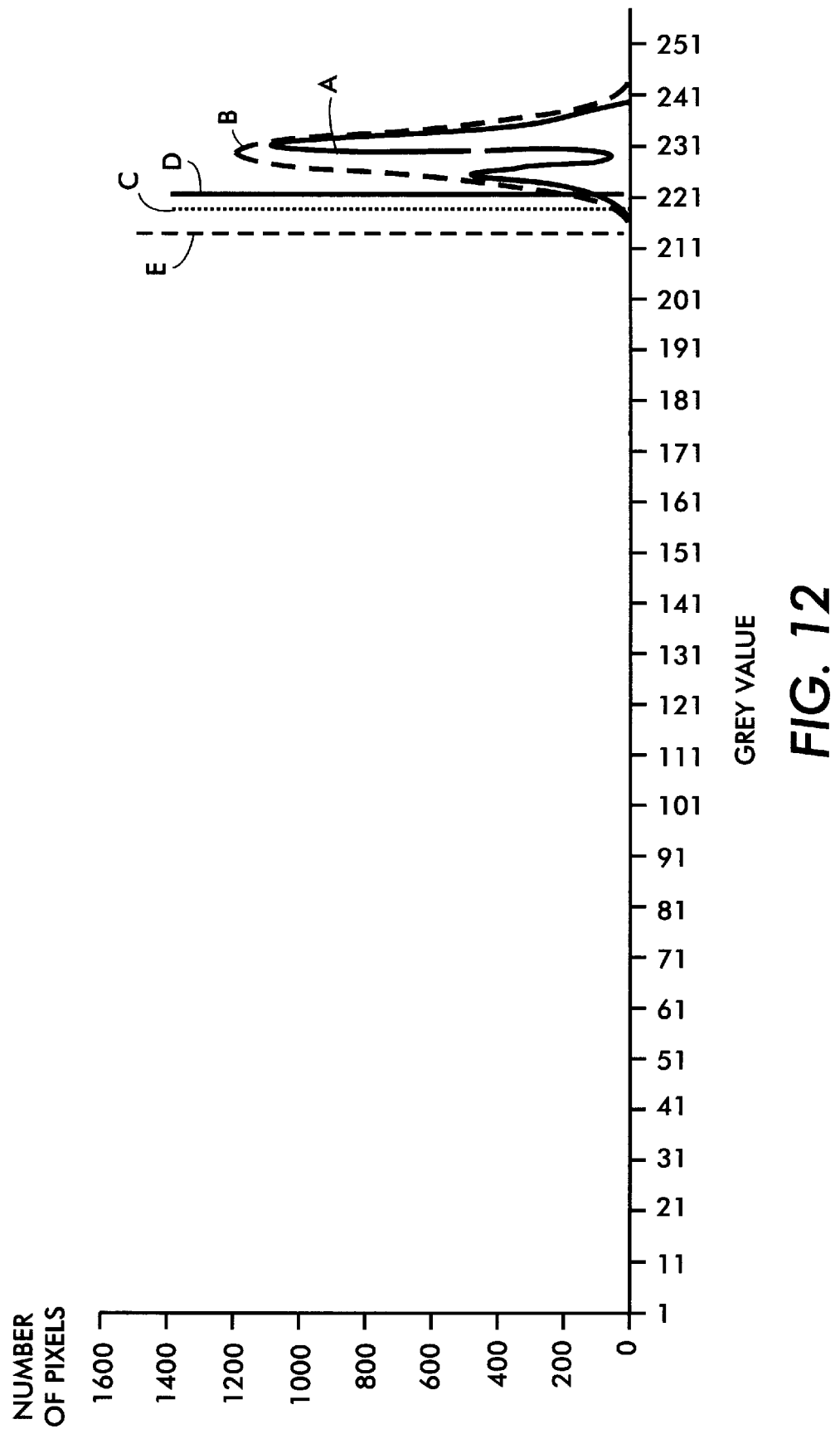
FIG. 12 is a graphical representation illustrating a histogram where no adjacent valley is found.

FIG. 12 illustrates an example of a histogram where no adjacent valley was found so the background value was estimated from ⅞ of the white peak value. As illustrated in FIG. 12, the histogram data is represented by line A, while a true histogram Gaussian approximation is represented by line B. Utilizing the concepts and processes of the present invention, the background peak value for the histogram illustrated in FIG. 12 was determined to be grey level 233. Moreover, when scanning the same image utilizing a sample window of the image, the peak grey value was also determined to be 233 by the present invention. Furthermore, as illustrated in FIG. 12, line C represents the four sigma point of the histogram from the sample window, while line D represents the four sigma point of the histogram distribution wherein the histogram is of the entire scanned image. Lastly, line E represents the four sigma point of the Gaussian approximation.

Figure 13:
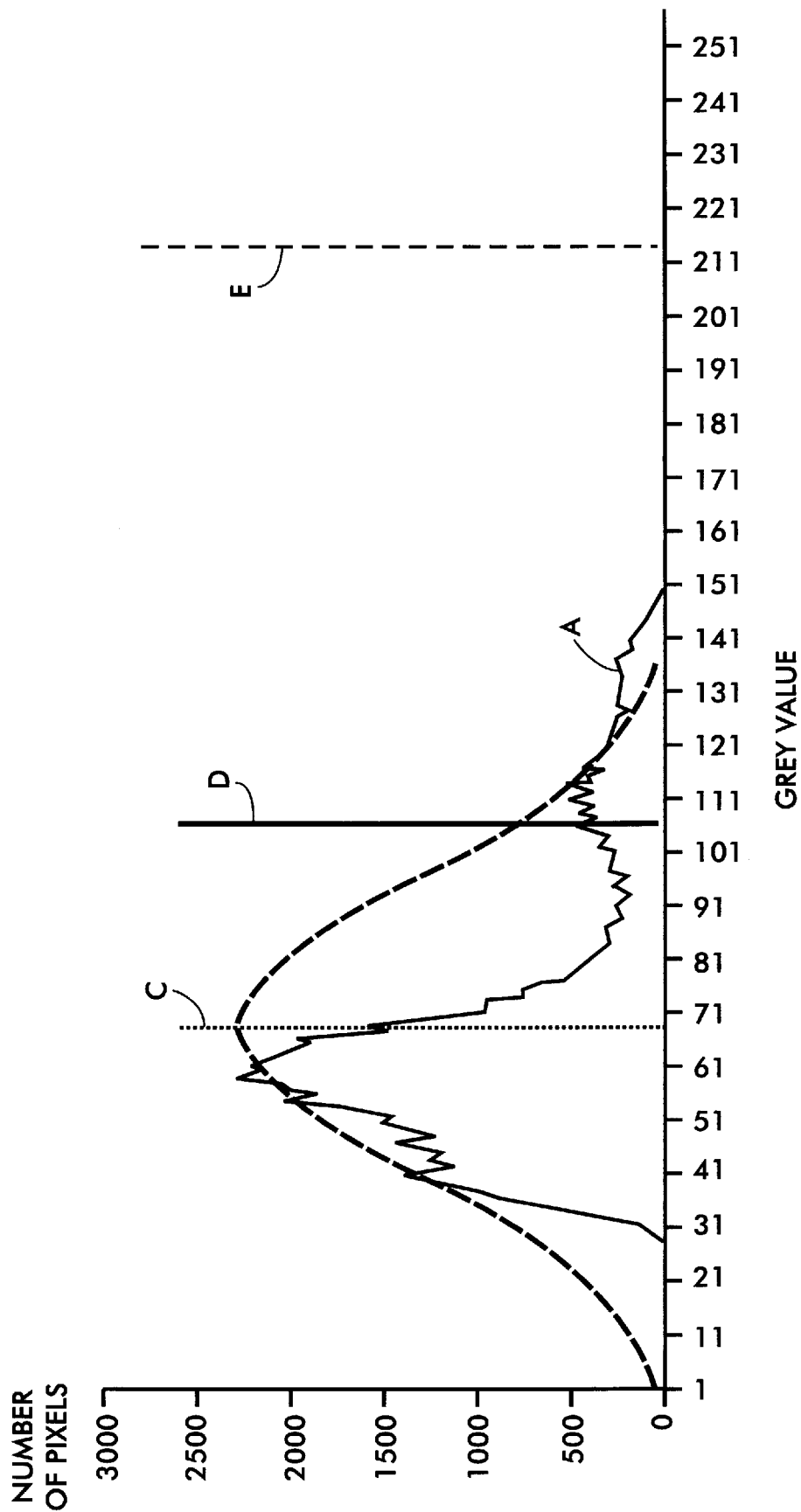
FIG. 13 is a graphical representation illustrating a histogram where the background value is estimated from a negative-slope side of a distribution.

Lastly, FIG. 13 illustrates an example of a histogram where both the two sigma and one sigma values can not be found so the background was estimated from the negative-slope side of the background distribution. As illustrated in FIG. 13, the histogram data is represented by line A, while a true histogram Gaussian approximation is represented by line B. Utilizing the concepts and processes of the present invention, the background peak value for the histogram illustrated in FIG. 13 was determined to be grey level 132. Moreover, when scanning the same image utilizing a sample window of the image, the peak grey value was also determined to be 130 by the present invention. Furthermore, as illustrated in FIG. 13, line C represents the four sigma point of the histogram from the sample window, while line D represents the four sigma point of the histogram distribution wherein the histogram is of the entire scanned image. Lastly, line E represents the four sigma point of the Gaussian approximation.

Although the present invention has been described in detail above, various modifications can be implemented without departing from the spirit of the present invention. For example, the preferred embodiment of the present invention has been described with respect to a CCD sensor array; however, this method is readily implemented with a full width array scanning system Moreover, the detection method of the present invention can be readily implemented on an ASIC, programmable gate array, or in software, thereby enabling the placement of this process in a scanner, electronic subsystem, printer, or display device.

Lastly, the present invention has been described with respect to a monochrome or black/white environment. However, the concepts of the present invention are readily applicable to a color environment. Namely, the detection process of the present invention can be applied to each color space value representing the color pixel.

While the present invention has been described with reference to various embodiments disclosed herein before, it is not to be confined to the detail set forth above, but is intended to cover such modifications or changes as made within the scope of the attached claims.

What is claimed is:

1. A method for automatically determining proper background values for a document, comprising the steps of:
   (a) generating a histogram of the document;
   (b) determining if a background characteristic of the document is uniform;
   (c) setting a white background value equal to a first calculated white peak value when said step (b) determines that a background characteristic of the document is uniform;
   (d) setting a white background value equal to a second calculated white peak value when said step (b) determines that a background characteristic of the document is non-uniform;
   (e) determining if a foreground value of the document is valid when said step (b) determines that a background characteristic of the document is uniform; and
   (f) setting a black background value equal to a black peak value calculated from the histogram when said step (e) determines that a foreground value of the document is valid.

2. The method as claimed in claim 1, wherein said step (b) comprises the substeps of:
   (b1) calculating a white peak ratio value which is proportional to a ratio of the calculated white peak value and a calculated half white peak power width value; and
   (b2) determining that a background characteristic of the document is uniform when the white peak ratio value is larger than a predetermined value.

3. The method as claimed in claim 1, wherein the first calculated white peak value is equal to $P_0-C(P_0-P_{1/4})$ where $P_0$ is a white peak value calculated from the histogram, $P_{1/4}$ is a quarter white peak value calculated from the histogram, and C is a constant.

4. The method as claimed in claim 3, wherein C equals 2.375 when $P_0$ is greater than 150.

5. The method as claimed in claim 3, wherein C equals $2.375(P_0/150)^2$ when $P_0$ is less than or equal 150.

6. The method as claimed in claim 3, wherein C equals 2.375 when $P_0$ is greater than 150 and C equals $2.375(P_0/150)^2$ when $P_0$ is less than or equal 150.

7. The method as claimed in claim 6, wherein said step (e) comprises the substeps of:
   (e1) calculating a foreground value threshold equal to the first calculated white peak value divided by a predetermined value; and
   (b2) determining that a foreground value is valid when a calculated black peak value is less than the foreground value threshold.

8. The method as claimed in claim 7, wherein the predetermined value is 2.5.

9. The method as claimed in claim 1, further comprising the steps of:
   (g) setting a black background value equal to a white peak value calculated from the histogram divided by a predetermined value when said step (e) determines that a foreground value of the document is invalid.

10. A system for automatically determining proper background values for a document, comprising:
    a histogram circuit to generate a histogram of the document; and
    a background value generation and detection circuit to determine if a background characteristic of the document is uniform;
    said background value generation and detection circuit setting a white background value equal to a first calculated white peak value when it is determined that a background characteristic of the document is uniform and setting a white background value equal to a second calculated white peak value when it is determined that a background characteristic of the document is non-uniform;
    said background value generation and detection circuit determining if a foreground value of the document is valid when it is determined that a background characteristic of the document is uniform;
    said background value generation and detection circuit setting a black background value equal to a black peak value calculated from the histogram when it is determined that a foreground value of the document is valid.

11. The system as claimed in claim 10, wherein said background value generation and detection circuit calculates a white peak ratio value which is proportional to a ratio of the calculated white peak value and a calculated half white peak power width value and determines that a background characteristic of the document is uniform when the white peak ratio value is larger than a predetermined value.

12. The system as claimed in claim 10, wherein the first calculated white peak value is equal to $P_0-C(P_0-P_{1/4})$ where $P_0$ is a white peak value calculated from the histogram, $P_{1/4}$ is a quarter white peak value calculated from the histogram, and C is a constant.

13. The system as claimed in claim 12, wherein C equals 2.375 when $P_0$ is greater than 150.

14. The system as claimed in claim 12, wherein C equals $2.375(P_0/150)^2$ when $P_0$ is less than or equal 150.

15. The system as claimed in claim 12, wherein C equals 2.375 when $P_0$ is greater than 150 and C equals $2.375(P_0/150)^2$ when $P_0$ is less than or equal 150.

16. The system as claimed in claim 15, wherein said background value generation and detection circuit calculates a foreground value threshold equal to the first calculated white peak value divided by a predetermined value and determines that a foreground value is valid when a calculated black peak value is less than the foreground value threshold.

17. The system as claimed in claim 16, wherein the predetermined value is 2.5.

18. The method as claimed in claim 10, wherein said background value generation and detection circuit sets a black background value equal to a white peak value calculated from the histogram divided by a predetermined value when it is determined that a foreground value of the document is invalid.

* * * * *